United States Patent
Staal et al.

(10) Patent No.: US 12,240,627 B2
(45) Date of Patent: Mar. 4, 2025

(54) REPAIRING A HAT STRINGER

(71) Applicant: THE BOEING COMPANY, Arlington, VA (US)

(72) Inventors: Remmelt A. Staal, Irvine, CA (US); Gary D. Oakes, Renton, WA (US); Arne K. Lewis, Auburn, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/358,854

(22) Filed: Jul. 25, 2023

(65) Prior Publication Data
US 2025/0033798 A1 Jan. 30, 2025

(51) Int. Cl.
*B64F 5/40* (2017.01)
*B23P 6/00* (2006.01)
*B64C 3/18* (2006.01)

(52) U.S. Cl.
CPC .............. *B64F 5/40* (2017.01); *B23P 6/00* (2013.01); *B23P 2700/01* (2013.01); *B64C 3/182* (2013.01)

(58) Field of Classification Search
CPC .......... B64F 5/40; B23P 6/00; B23P 2700/01; B64C 3/182
See application file for complete search history.

(56) References Cited

U.S. PATENT DOCUMENTS

| | | | | |
|---|---|---|---|---|
| 8,377,247 B2* | 2/2013 | Guzman | ............... | B29C 70/342 156/286 |
| 8,419,402 B2* | 4/2013 | Guzman | ............... | B29C 70/865 264/156 |
| 8,500,066 B2* | 8/2013 | Lewis | ............... | B64C 1/064 343/705 |
| 8,540,921 B2* | 9/2013 | Senibi | ............... | B32B 27/00 264/316 |
| 8,570,152 B2* | 10/2013 | Fahley | ............... | H02J 50/80 244/119 |
| 8,617,687 B2* | 12/2013 | McCarville | ............... | B64C 1/064 428/116 |
| 9,694,895 B2* | 7/2017 | Senibi | ............... | B32B 3/28 |
| 10,857,751 B2* | 12/2020 | Cheng | ............... | B29D 99/0005 |
| 10,913,215 B2* | 2/2021 | Cheng | ............... | B29C 70/205 |
| 10,919,256 B2* | 2/2021 | Cheng | ............... | B29C 70/20 |

(Continued)

OTHER PUBLICATIONS

Extended European Search Report for EP 24178401.6-1014, dated Dec. 11, 2024.

*Primary Examiner* — Lawrence Averick
(74) *Attorney, Agent, or Firm* — Joseph M. Butscher; The Small Patent Law Group LLC

(57) ABSTRACT

The present disclosure provides a method of repairing a hat stringer. The method includes arranging a repair stringer in a mounting location that is one of a plurality of possible mounting locations along a cross section of a hat stringer. In each of the plurality of possible mounting locations, at least a portion of an internal profile of the repair stringer matches at least a portion of a profile of an internal cavity defined by the hat stringer. A cross-sectional area of the repair stringer as viewed along a first direction is less than a total cross-sectional area of the hat stringer as viewed along the first direction. The method also includes coupling the repair stringer with a stringer of the hat stringer in the mounting location. Repair stringers and repaired hat stringers are also provided.

19 Claims, 14 Drawing Sheets

(56) References Cited

U.S. PATENT DOCUMENTS

| | | | |
|---|---|---|---|
| 10,919,260 B2* | 2/2021 | Cheng | B32B 5/26 |
| 11,242,127 B2* | 2/2022 | Cheng | B64C 1/064 |
| 11,325,339 B2* | 5/2022 | Cheng | B29C 70/30 |
| 11,325,688 B2* | 5/2022 | Cheng | B32B 5/12 |
| 11,325,689 B2* | 5/2022 | Cheng | B29D 99/0007 |
| 11,400,657 B2* | 8/2022 | Staal | B29C 70/84 |
| 2011/0088833 A1* | 4/2011 | Guzman | B64C 3/182 |
| | | | 156/182 |
| 2012/0104166 A1 | 5/2012 | Pina | |
| 2013/0316147 A1* | 11/2013 | Douglas | B64C 3/182 |
| | | | 156/60 |
| 2019/0099959 A1* | 4/2019 | Staal | B29C 70/342 |
| 2019/0210308 A1 | 7/2019 | Marouze | |
| 2020/0354035 A1* | 11/2020 | Cheng | B29C 70/302 |
| 2022/0258432 A1* | 8/2022 | Staal | B32B 5/26 |

* cited by examiner

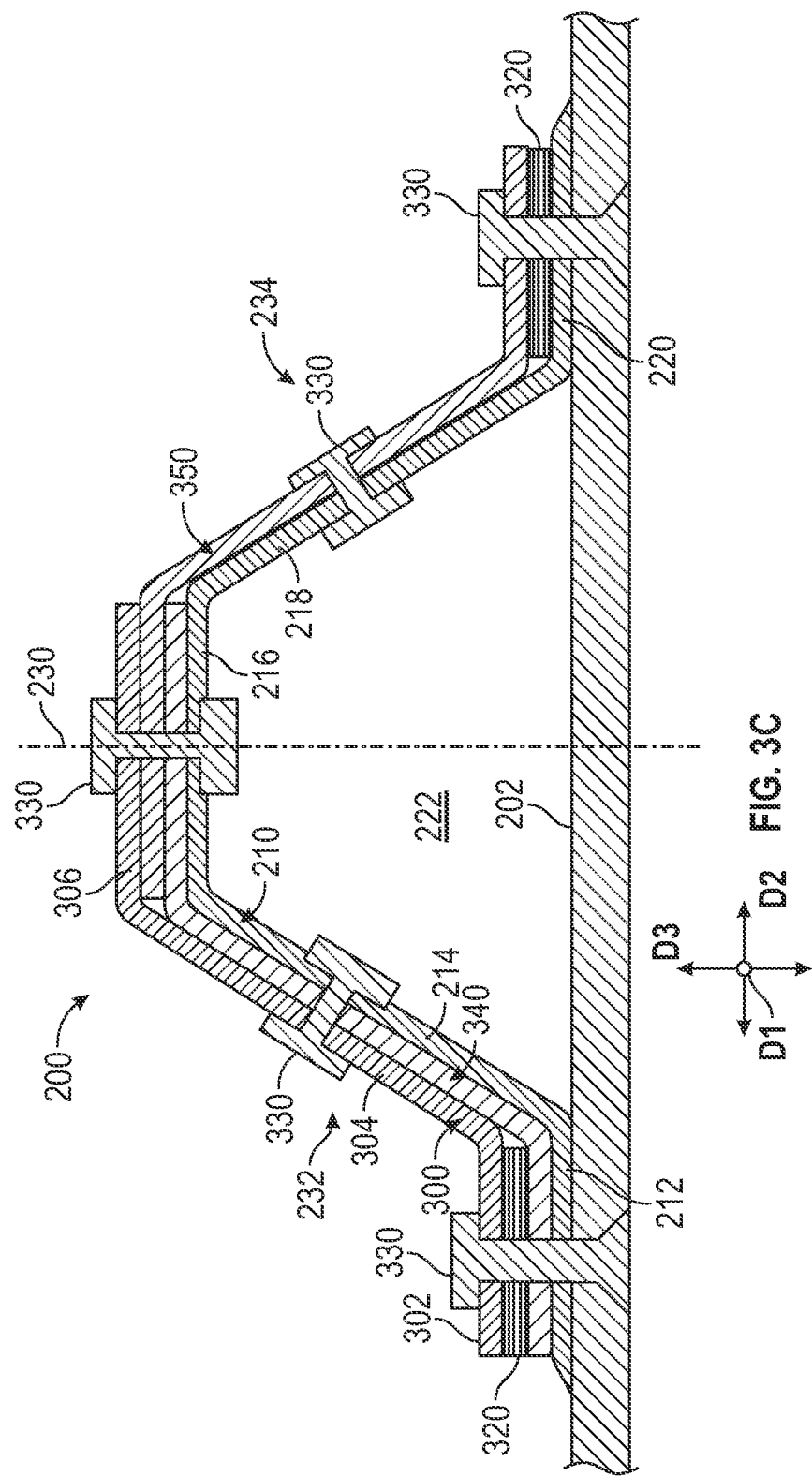

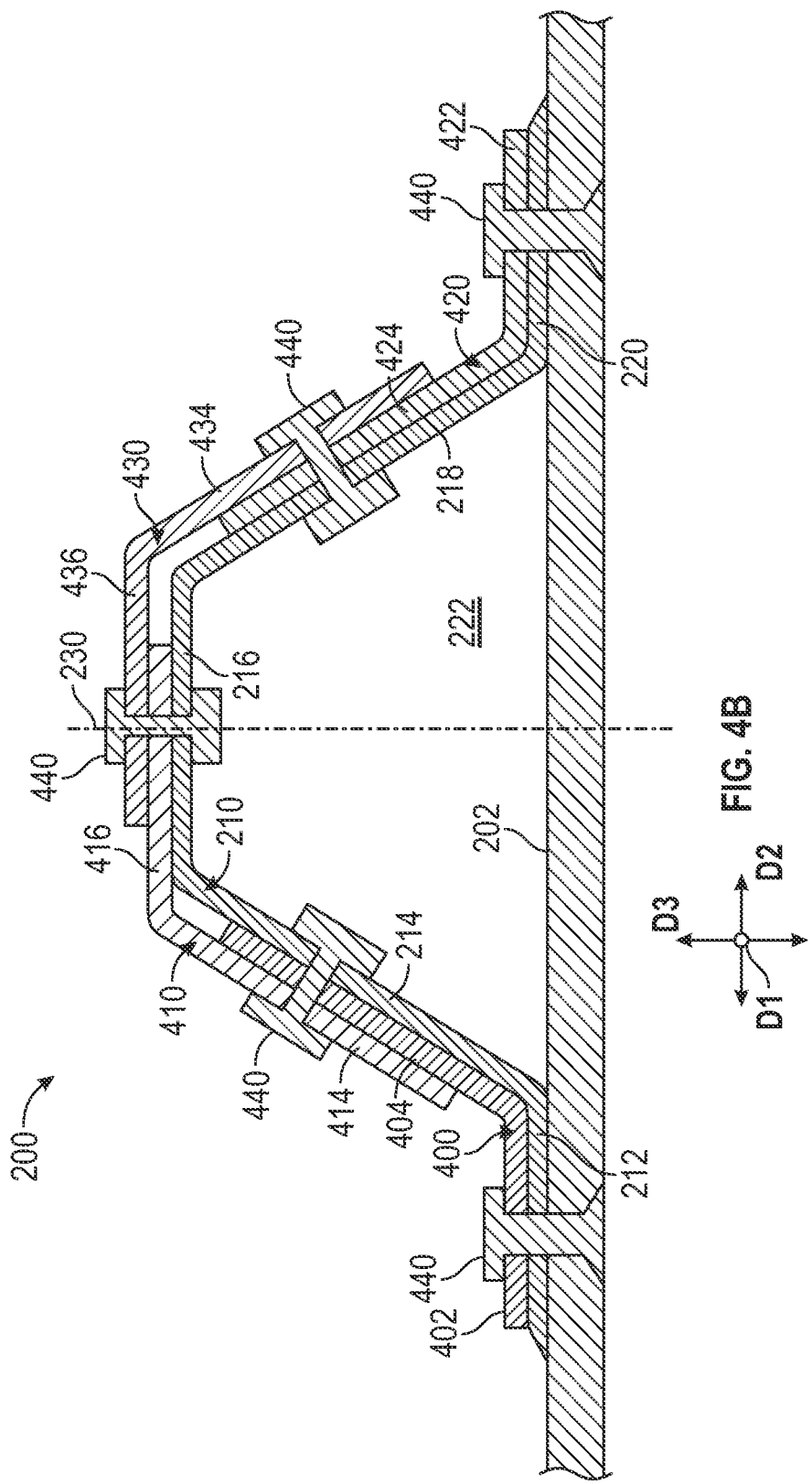

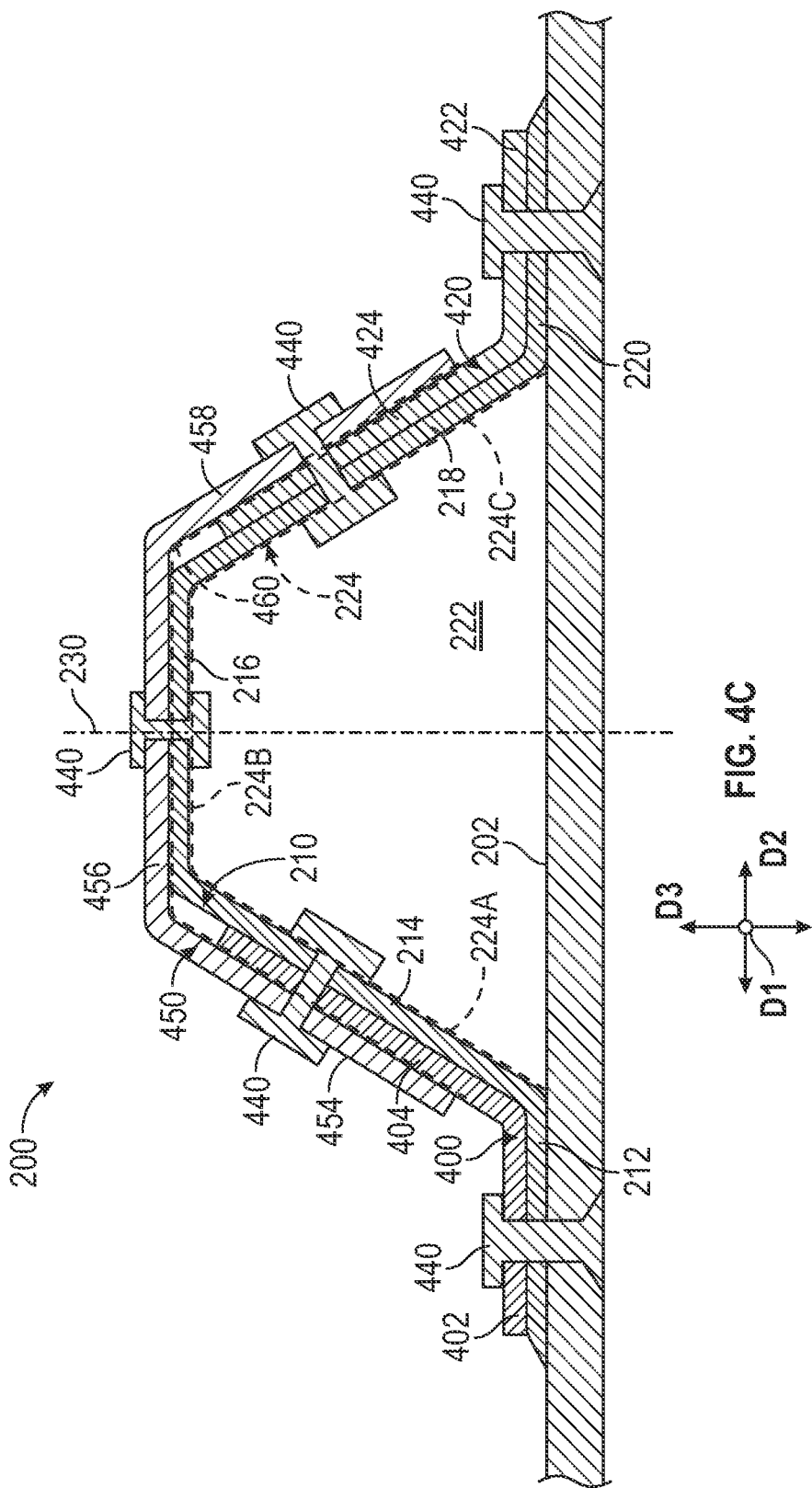

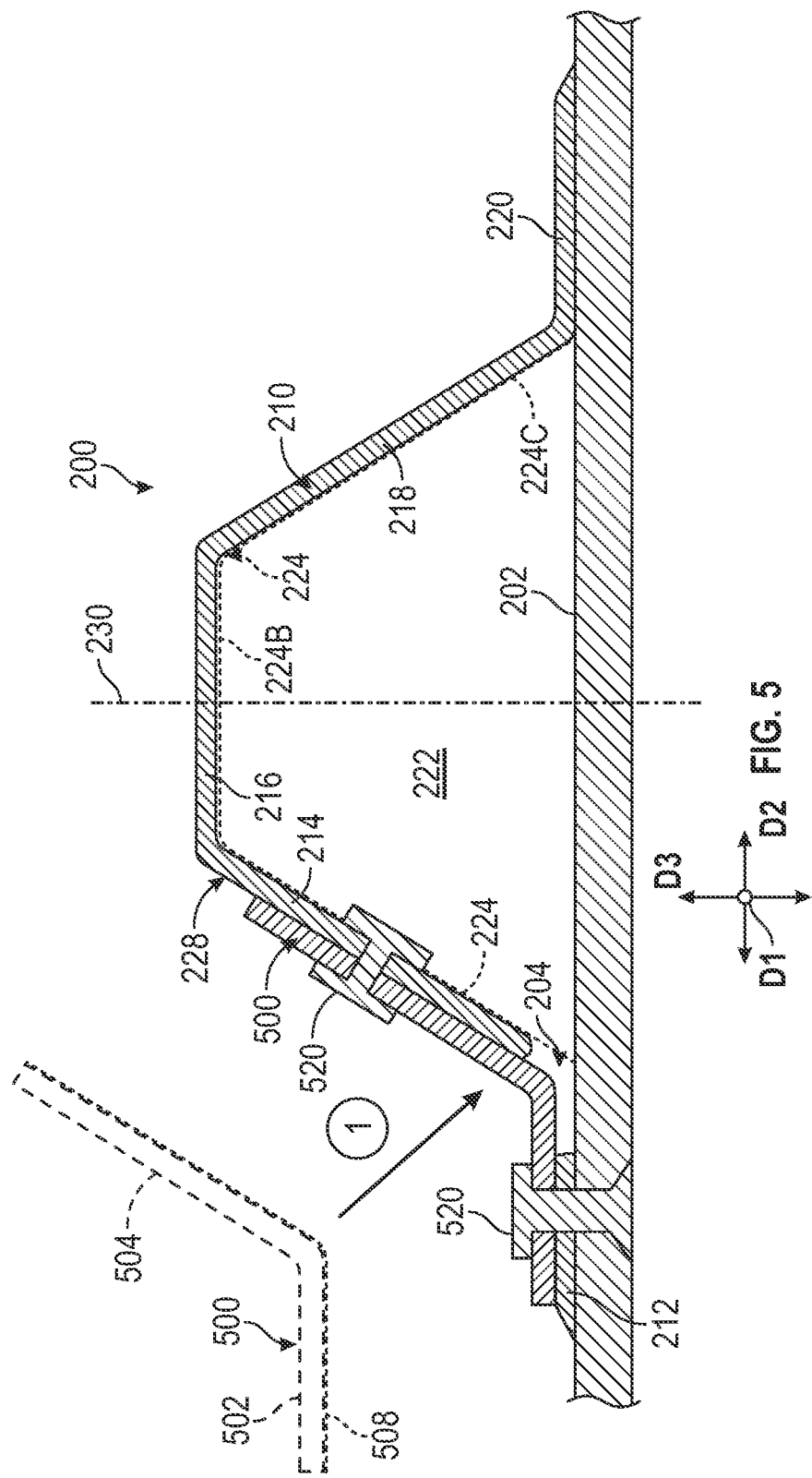

700 ⇘

702
Arranging a repair stringer in a mounting location that is one of a plurality of possible mounting locations along a cross section of a hat stringer, and in each of the plurality of possible mounting locations, at least a portion of an internal profile of the repair stringer matches at least a portion of a profile of an internal cavity defined by the hat stringer, and wherein a cross-sectional area of the repair stringer as viewed along a first direction is less than a total cross-sectional area of hat stringer as viewed along the first direction 704
Coupling the repair stringer with a stringer of the hat stringer in the mounting location

FIG. 7

REPAIRING A HAT STRINGER

FIELD

Aspects of the present disclosure relate to repair of aircraft structural components, and more particularly, to repair of hat stringers.

BACKGROUND

Aircraft structures must be capable of handling loads in a variety of different directions. For example, an aircraft wing must be capable of handling aerodynamic loads that are imposed on the wing during flight. Such aerodynamic loads include bending loads that are reacted by the wing skin and the internal wing structure. Bending loads are typically reacted by stiffeners or stringers in the internal wing structure. Stringers are coupled to the wing skin and generally extend in a spanwise direction along the wing interior. Stringers may be provided in a variety of different cross-sectional shapes and sizes, including with a hat-shaped cross section. A hat-shaped stringer, or simply hat stringer, typically includes a pair of webs that extend from a base portion of the stringer and are connected by a cap to enclose the hat-shaped cross section.

In some instances, hat stringers can be become damaged or otherwise in need of reinforcement, e.g., due to an impact event. Conventional techniques for repairing damaged hat stringers has presented certain challenges. Accordingly, one or more improved hat stringer repair techniques and/or repair stringers are needed.

SUMMARY

In one aspect, the present disclosure provides a method of repairing a hat stringer. The method includes arranging a repair stringer in a mounting location that is one of a plurality of possible mounting locations along a cross section of a hat stringer, and in each of the plurality of possible mounting locations, at least a portion of an internal profile of the repair stringer matches at least a portion of a profile of an internal cavity defined by the hat stringer, and wherein a cross-sectional area of the repair stringer as viewed along a first direction is less than a total cross-sectional area of the hat stringer as viewed along the first direction. The method also includes coupling the repair stringer with a stringer of the hat stringer in the mounting location.

In some further aspects, in combination with any example method above or below, in each of the plurality of possible mounting locations, the repair stringer has a web segment that extends parallel with a web portion of the profile of the internal cavity.

In some further aspects, in combination with any example method above or below, in each of the plurality of possible mounting locations, the repair stringer has at least one segment that extends parallel with a cap portion of the internal cavity or a flange segment of the stringer.

In some further aspects, in combination with any example method above or below, the hat stringer defines a central plane demarcating a first side and a second side of the hat stringer, and wherein the plurality of possible mounting locations include a first possible mounting location in which the repair stringer is positioned primarily on the first side of the hat stringer and a second possible mounting location in which the repair stringer is positioned primarily on the second side of the hat stringer.

In some further aspects, in combination with any example method above or below, the repair stringer has a cap segment, a flange segment, and a web segment extending between and connecting the cap segment and the flange segment, and wherein in arranging the repair stringer in the mounting location, the cap segment, the web segment, and the flange segment of the repair stringer respectively extend parallel with a cap segment, a web segment, and a flange segment of the stringer.

In some further aspects, in combination with any example method above or below, the repair stringer is a first repair stringer, and wherein the method further includes arranging a second repair stringer in a mounting location along the cross section of the hat stringer, the second repair stringer is shaped to have an internal profile that matches at least a portion of the profile of the internal cavity, and wherein a cap segment of the second repair stringer and a cap segment of the first repair stringer physically overlap one another and each extend parallel with a cap portion of the profile of the internal cavity.

In some further aspects, in combination with any example method above or below, the first repair stringer has a web segment that physically overlaps a first web segment of the stringer and the second repair stringer has a web segment that physically overlaps a second web segment of the stringer.

In some further aspects, in combination with any example method above or below, the second repair stringer has a flange segment that extends parallel with, but is spaced from, a second flange segment of the stringer, and wherein the method further includes placing one or more shims between the second flange segment and the flange segment of the second repair stringer.

In some further aspects, in combination with any example method above or below, the second repair stringer has a same cross-sectional shape as the first repair stringer as viewed along the first direction.

In yet other aspects, in combination with any example method above or below, the method further includes arranging a second repair stringer in a mounting location along the cross section of the hat stringer, the second repair stringer is shaped to have an internal profile that matches at least a portion of the profile of the internal cavity. The method also includes arranging a third repair stringer in a mounting location along the cross section of the hat stringer, the third repair stringer has a first web segment, a cap segment, and a second web segment. The first web segment is coupled with the repair stringer, the cap segment is coupled with the stringer, and the second web segment is coupled with the second repair stringer.

In some further aspects, in combination with any example method above or below, the hat stringer defines a central plane demarcating a first side and a second side of the hat stringer and the plurality of possible mounting locations include at least four possible mounting locations, and wherein the at least four possible mounting locations include at least two possible mounting locations in which the repair stringer is capable of being positioned primarily on the first side of the hat stringer and at least two possible mounting locations in which the repair stringer is capable of being positioned primarily on the second side of the hat stringer.

In some further aspects, in combination with any example method above or below, the at least two possible mounting locations in which the repair stringer is capable of being positioned primarily on the first side of the hat stringer include a first mounting location and a second mounting location, and in the first mounting location, one segment of the repair stringer extends parallel with a first flange segment of the stringer and one segment of the repair stringer extends parallel with a first web segment of the stringer, and in the second mounting location, one segment of the repair stringer extends parallel with a cap segment of the stringer and one segment of the repair stringer extends parallel with the first web segment of the stringer.

In some further aspects, in combination with any example method above or below, the at least two possible mounting locations in which the repair stringer is positioned primarily on the second side of the hat stringer include a first mounting location and a second mounting location, and in the first mounting location, one segment of the repair stringer extends parallel with a cap segment of the stringer and one segment of the repair stringer extends parallel with a second web segment of the stringer, and in the second mounting location, one segment of the repair stringer extends parallel with a second flange segment of the stringer and one segment of the repair stringer extends parallel with the second web segment of the stringer.

In some further aspects, in combination with any example method above or below, the stringer includes a first flange segment, a first web segment, a cap segment, a second web segment, and a second flange segment, and wherein the plurality of possible mounting locations along the cross section of the hat stringer include a first mounting location, a second mounting location, a third mounting location, and a fourth mounting location, and: in the first mounting location, one segment of the repair stringer extends parallel with the first flange segment of the stringer and one segment of the repair stringer extends parallel with a first web segment of the stringer, in the second mounting location, one segment of the repair stringer extends parallel with the cap segment of the stringer and one segment of the repair stringer extends parallel with the first web segment of the stringer, in the third mounting location, one segment of the repair stringer extends parallel with the cap segment of the stringer and one segment of the repair stringer extends parallel with the second web segment of the stringer, and in the fourth mounting location, one segment of the repair stringer extends parallel with the second flange segment of the stringer and one segment of the repair stringer extends parallel with the second web segment of the stringer.

In some further aspects, in combination with any example method above or below, the repair stringer is a first repair stringer and the mounting location is the first mounting location, and wherein the method further includes arranging a second repair stringer in the second mounting location; arranging a third repair stringer in the third mounting location; arranging a fourth repair stringer in the fourth mounting location; and coupling the second repair stringer, the third repair stringer, and the fourth repair stringer to the stringer in the second mounting location, the third mounting location, and the fourth mounting location, respectively, the first repair stringer being coupled with the stringer in the first mounting location.

In some further aspects, in combination with any example method above or below, the first and second repair stringers physically overlap one another, the second and third repair stringers physically overlap one another, and the third and fourth repair stringers physically overlap one another.

In some further aspects, in combination with any example method above or below, the first, second, third, and fourth repair stringers all have a same cross-sectional shape as viewed along the first direction, and wherein the second repair stringer is oriented so as to be flipped vertically and horizontally with respect to the first repair stringer, the third repair stringer is oriented so as to be flipped vertically with respect to the first repair stringer, and the fourth repair stringer is oriented so as to be flipped horizontally with respect to the first repair stringer.

In some further aspects, in combination with any example method above or below, the repair stringer is a first repair stringer, and wherein the first repair stringer is arranged so that a segment of the first repair stringer is positioned in or adjacent a plane where a missing section of the stringer was previously positioned, and wherein the method further includes arranging a second repair stringer and a third repair stringer so that segments of the second repair stringer and the third repair stringer sandwich the segment of the first repair stringer positioned within or adjacent the plane; arranging a fourth repair stringer so that a segment of the fourth repair stringer and the first repair stringer sandwich the second repair stringer; and coupling the first, second, third, and fourth repair stringers with one another and the stringer.

In another aspect, a method is provided. The method includes arranging a first repair stringer along a cross section of a hat stringer, an internal profile of the first repair stringer matches at least a portion of a profile of an internal cavity defined by the hat stringer; arranging a second repair stringer along the cross section of the hat stringer, an internal profile of the second repair stringer matches at least a portion of the profile of the internal cavity, the first and second repair stringers being arranged so that a segment of the second repair stringer physically overlaps a segment of the first repair stringer; and coupling the first repair stringer and the second repair stringer with a stringer of the hat stringer.

In a further aspect, a repair stringer is provided. The repair stringer includes a web segment, the web segment having an internal profile shaped to match a web portion of a profile of an internal cavity defined by a hat stringer; and at least one of a cap segment and a flange segment extending from the web segment, and wherein the repair stringer has a partial cross section with respect to a total cross section of the hat stringer.

In another aspect, a method is provided. The method includes arranging a first repair stringer so that a segment of the first repair stringer is positioned in or adjacent a plane where a missing section of a base stringer was previously positioned. The method further includes arranging a second repair stringer and a third repair stringer so that segments of the second repair stringer and the third repair stringer sandwich the segment of the first repair stringer positioned within or adjacent the plane. The method also includes arranging a fourth repair stringer so that a segment of the fourth repair stringer and the first repair stringer sandwich the second repair stringer. The method also includes coupling the first, second, third, and fourth repair stringers with the base stringer.

In yet another aspect, a hat stringer is provided. The hat stringer includes a stringer. The hat stringer also includes at least one repair stringer coupled with the stringer, the repair stringer being coupled with the stringer in a mounting location that is one of a plurality of possible mounting locations along a cross section of the hat stringer, and in each of the plurality of possible mounting locations, the repair stringer is shaped to have an internal profile that matches at least a portion of a profile of an internal cavity defined by the hat stringer. Further, a cross-sectional area of the repair stringer is less than a total cross-sectional area of the hat stringer.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIG. 3C is a cross-sectional view of another hat stringer undergoing a full stringer restoration with repair stringers having a "lazy Z" shape;

FIGS. 4A and 4B are cross-sectional views of a hat stringer undergoing a full stringer restoration with repair stringers having a "lazy L" shape;

FIG. 4C is a cross-sectional view of another hat stringer undergoing a full stringer restoration with repair stringers having a "lazy Z" shape and one repair stringer having a "lazy U" shape;

FIG. 5 is a cross-sectional view of a hat stringer undergoing a partial stringer restoration;

FIG. 7 is a flow diagram of a method of repairing a hat stringer according to one aspect of the present disclosure;

DETAILED DESCRIPTION

Figure 1:
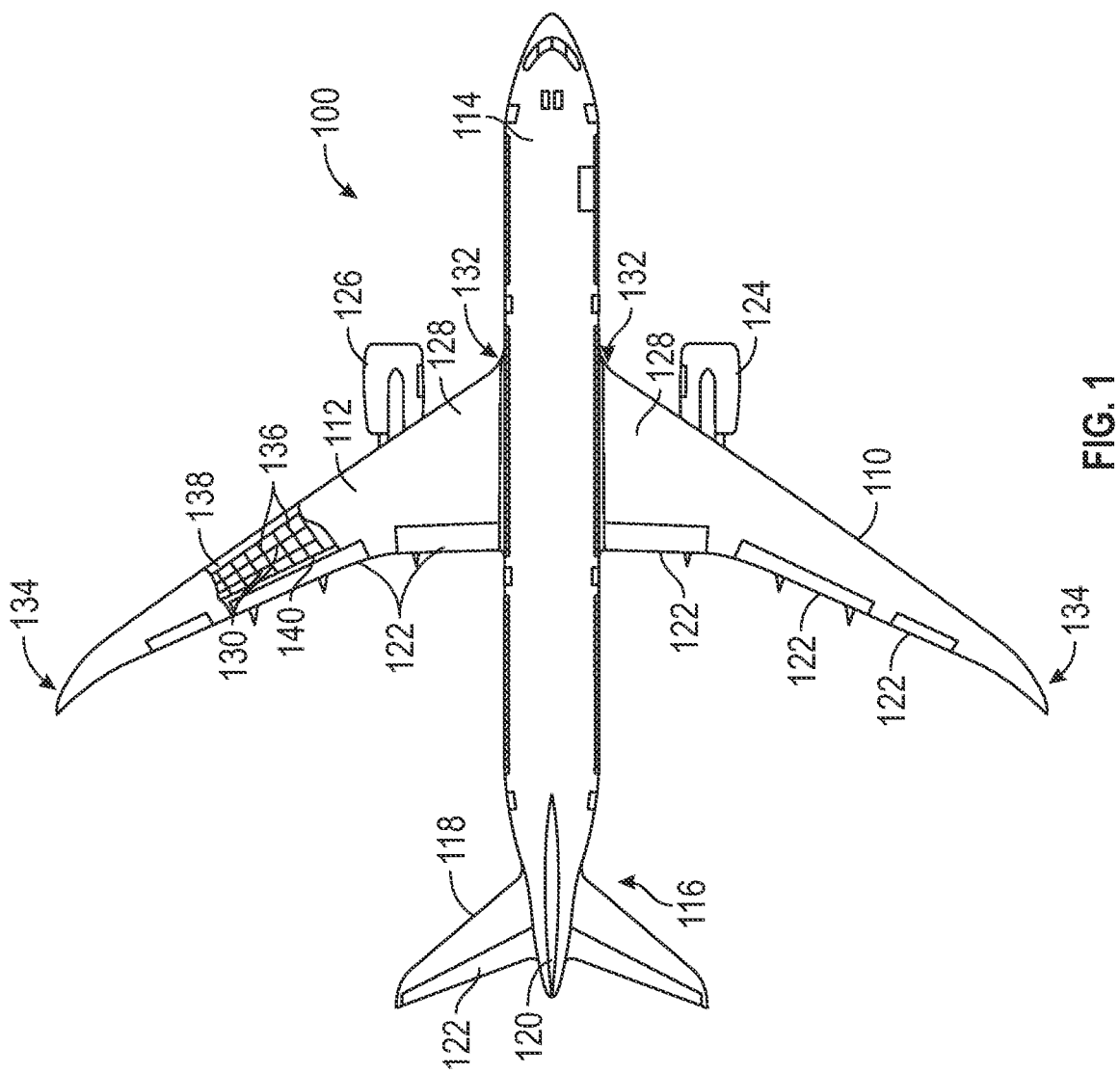
FIG. 1 is a top plan view of an example aircraft having a wing that includes at least one hat stringer.

The present disclosure relates to repair of hat stringers. In some instances, a hat stringer, which can support a skin member of an aircraft, can be become damaged or otherwise in need of structural reinforcement, e.g., due to an impact event during service. Hat stringers can also sometimes be removed to make room for a skin repair. In accordance with inventive aspects of the present disclosure, hat stringer repair techniques and repair stringers that facilitate repair or reinforcement of a hat stringer are provided herein. Such repair stringers can include an internal geometric profile that matches the internal cavity profile of a stringer, e.g., of a type 1, 2, and/or 3 stringer. The repair stringers can be arranged so that segments of the repair segments physically overlap one another, e.g., along a cap section or a web section of the hat stringer. The inventive aspects disclosed herein can advantageously minimize the amount of parts that are needed, and can eliminate or reduce the need for shimming. A reduction in parts also reduces weight of the aircraft, which is also beneficial. Further, the unique geometric profile of the repair stringers disclosed herein can improve applicability of repair solutions across a larger portion of the body of an aircraft and can making stocking repair parts easier for airline operators, among other advantages.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s). In addition, as used herein, a repair stringer is positioned primarily on a side of a hat stringer (as defined by a sagittal or central plane) when greater than fifty percent (50%) of the cross section of the repair stringer is positioned on that side.

While the foregoing is directed to aspects of the present disclosure, other and further aspects of the disclosure may be devised without departing from the basic scope thereof, and the scope thereof is determined by the claims that follow.

Referring now to the drawings, FIG. 1 depicts a top plan view of an aircraft 100 according to example aspects of the present disclosure. As shown, the aircraft 100 includes a pair of wings 110, 112 and a fuselage 114. The wings 110, 112 extend laterally outward from the fuselage 114. The aircraft 100 also includes a tail section 116 having a horizontal stabilizer 118 and a vertical stabilizer 120. The wings 110, 112, the horizontal stabilizer 118, and the vertical stabilizer 120 all include control surfaces 122 (e.g., ailerons, elevators, rudder, etc.) that can be controlled to maneuver the aircraft 100 during flight. The aircraft 100 further includes propulsion units 124, 126 mounted to respective wings 110, 112. In FIG. 1, the propulsion units 124, 126 are gas turbine engines configured as turbofans. However, in other example aspects, the propulsion units 124, 126 can be other types of propulsion units, such as electrically-driven fans.

The wings 110, 112 each include skin members 128 that can be internally supported by various structures, such as stringers 130 and ribs 136 as illustrated by the cutaway portion of the wing 112 in FIG. 1. The stringers 130 are positioned in spaced relation to one another and generally extend spanwise from an inboard portion 132 to an outboard portion 134 of their respective wings 110, 112. One or more of the stringers 130 can have a hat-shaped cross section, e.g., as viewed along a spanwise direction of its associated wing. In this regard, the stringers 130 can be "hat stringers" in some example aspects. As further depicted in FIG. 1, the ribs 136 are positioned in spaced relation to one another and generally extend chordwise, e.g., from a forward structure, such as a front spar 138, to a rear structure, such as a rear spar 140, of their respective wings 110, 112.

Figure 2:
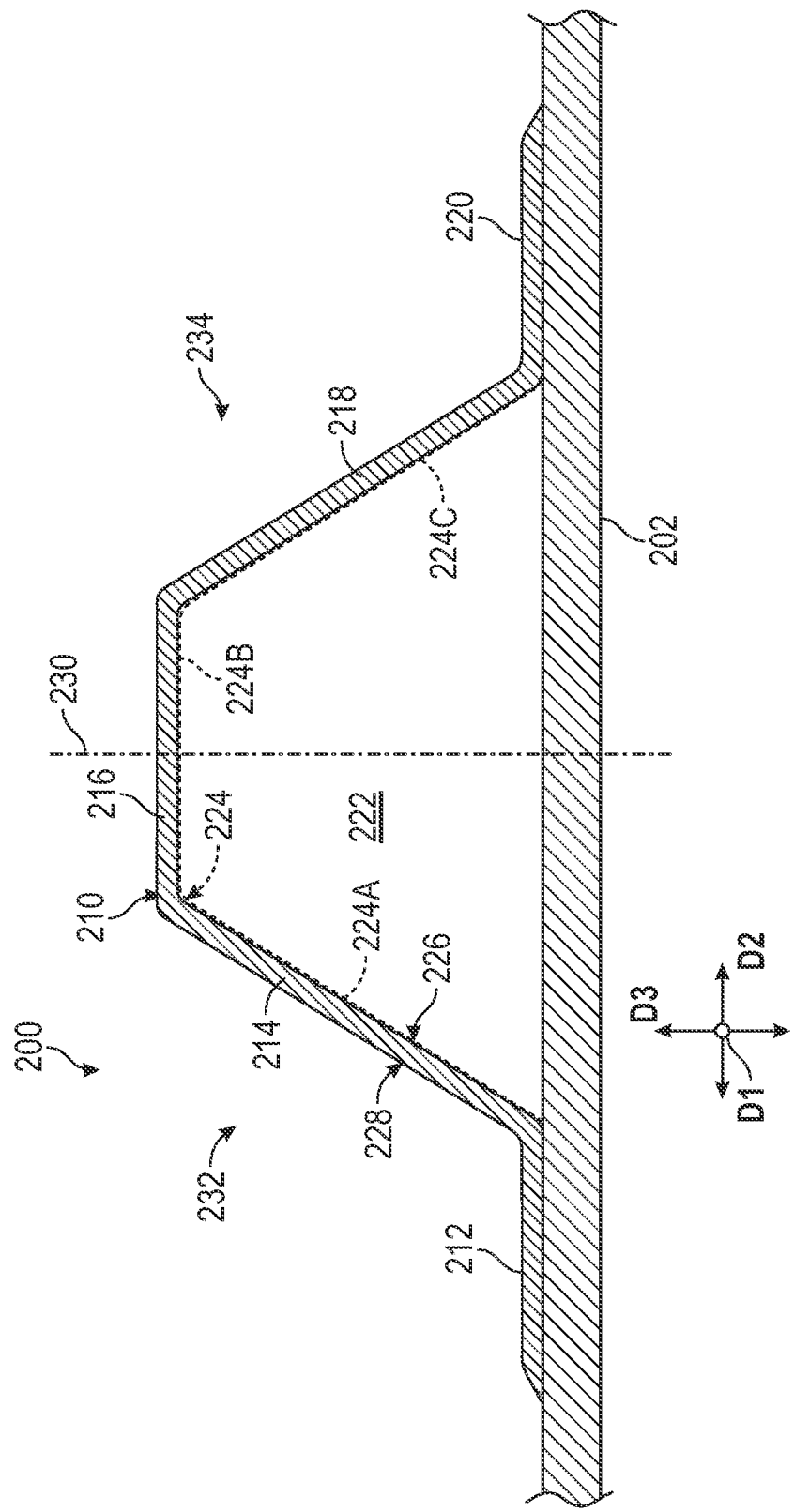
FIG. 2 is a cross-sectional view of a hat stringer.

FIG. 2 is a cross-sectional view of a hat stringer 200. The hat stringer can be one of the hat stringers 130 of the aircraft 100 of FIG. 1, for example. For reference, a first direction D1 (extending into and out of the page in FIG. 2), a second direction D2, and a third direction D3 are defined. The first, second, and third directions D1, D2, D3 are mutually perpendicular and form an orthogonal direction system. In FIG. 2, the first direction D1 is a spanwise direction along a wing of an aircraft. In this regard, FIG. 2 depicts a cross section of the hat stringer 200 as viewed along a spanwise direction of a wing. The third direction D3 can be a vertical direction.

As illustrated in FIG. 2, the hat stringer 200 is coupled with a skin member 202 to provide support thereto. The skin member 202 can be a lower wing skin of a wing, for example. The hat stringer 130 includes a base stringer 210. The base stringer 210 can be formed of one or more plies, such as one or more Carbon Fiber-Reinforced Polymers (CFRP) plies. The base stringer 210 can be formed as a monolithic unitary structure, for example. The base stringer 210 has, from left to right in FIG. 2, a first flange segment 212, a first web segment 214, a cap segment 216, a second web segment 218, and a second flange segment 220. The first and second flange segments 212, 220 are coupled with the skin member 202. The first and second web segments 214, 218 extend from their respective first and second flange segments 212, 220 and converge toward one another as they extend away from their respective first and second flange segments 212, 220. The cap segment 216 connects the first and second web segments 214, 218 and generally extends parallel to the first and second flange segments 212, 220 and the skin member 202.

The base stringer 210 and the skin member 202 collectively define an internal cavity 222. A profile 224 of the internal cavity 222 is defined by the base stringer 210. Particularly, the profile 224 of the internal cavity 222 as viewed along the first direction D1 is defined by an internal surface 226 of the base stringer 210 (e.g., when in serviceable condition). In FIG. 2, the profile 224 of the internal cavity 222 is represented by a dashed line extending along the internal surface 226 of the base stringer 210, or more specifically, along the internal surfaces of the first and second web segments 214, 218 and the cap segment 216. The profile 224 has a first web portion 224A, a cap portion 224B, and a second web portion 224C. The first web portion 224A extends along the internal surface of the first web segment 214, the cap portion 224B extends along the internal surface of the cap segment 216, and the second web portion 224C extends along the internal surface of the second web segment 218. The base stringer 210 has an external surface 228 opposite the internal surface 226. Moreover, for reference, the hat stringer 200 defines a central plane 230 demarcating a first side 232 and a second side 234 of the hat stringer 200. The central plane 230 is orthogonal to the second direction D2.

In some instances, a hat stringer, such as the hat stringer 200 of FIG. 2, can be become damaged or otherwise in need of structural reinforcement, e.g., due to an impact event during service. For instance, a segment of the hat stringer 200 may be damaged to an extent that its structural integrity is compromised, or in some extreme cases, missing completely. This may present a safety issue or render the aircraft unfit for service. In accordance with inventive aspects of the present disclosure, hat stringer repair techniques and repair stringers that facilitate repair or reinforcement of a hat stringer are provided herein. Example restoration techniques and repair stringers are provided below.

Figure 3A:
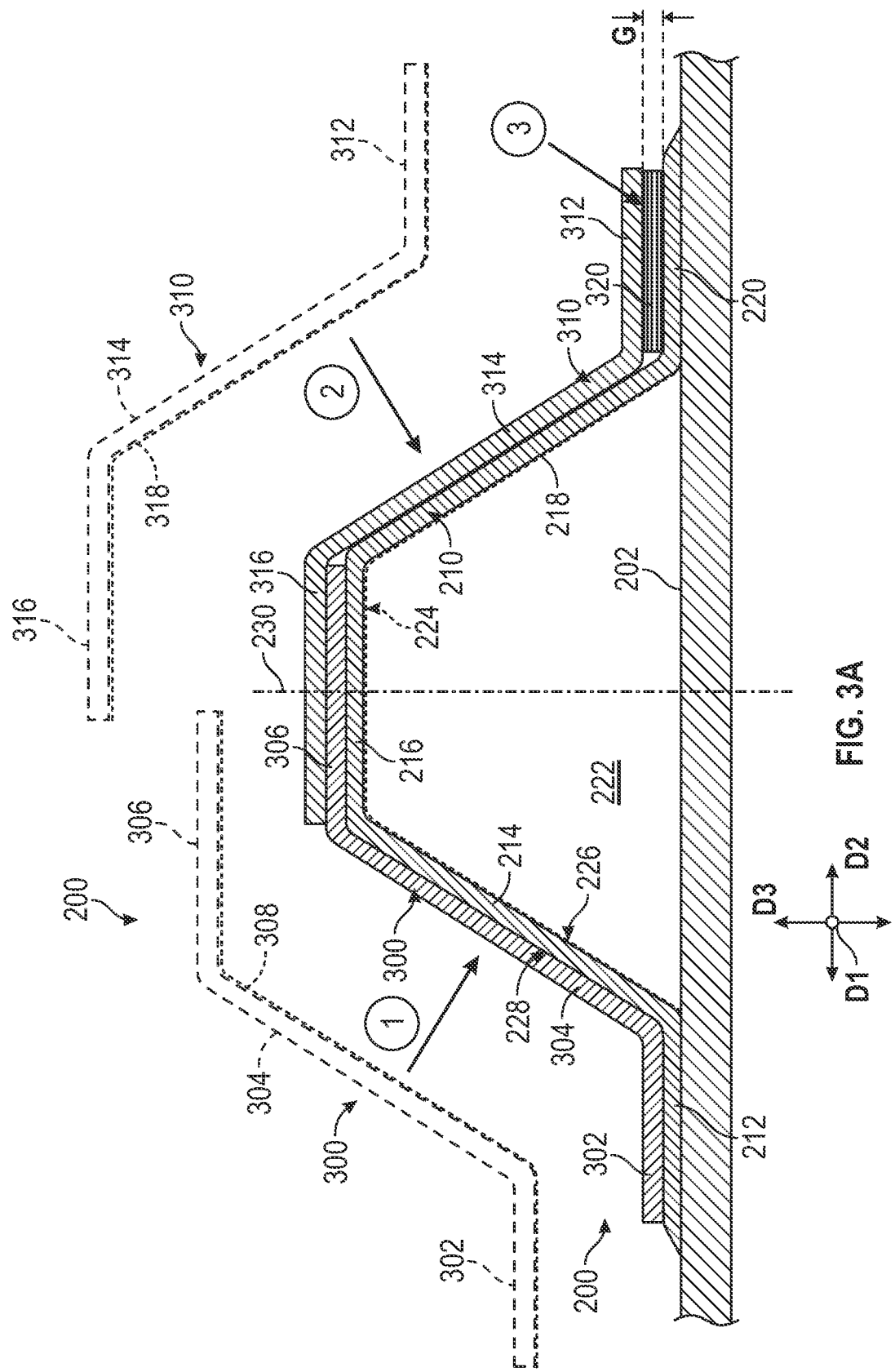
FIGS. 3A and 3B are cross-sectional views of a hat stringer undergoing a full stringer restoration with repair stringers having a "lazy Z" shape.
Figure 3B:
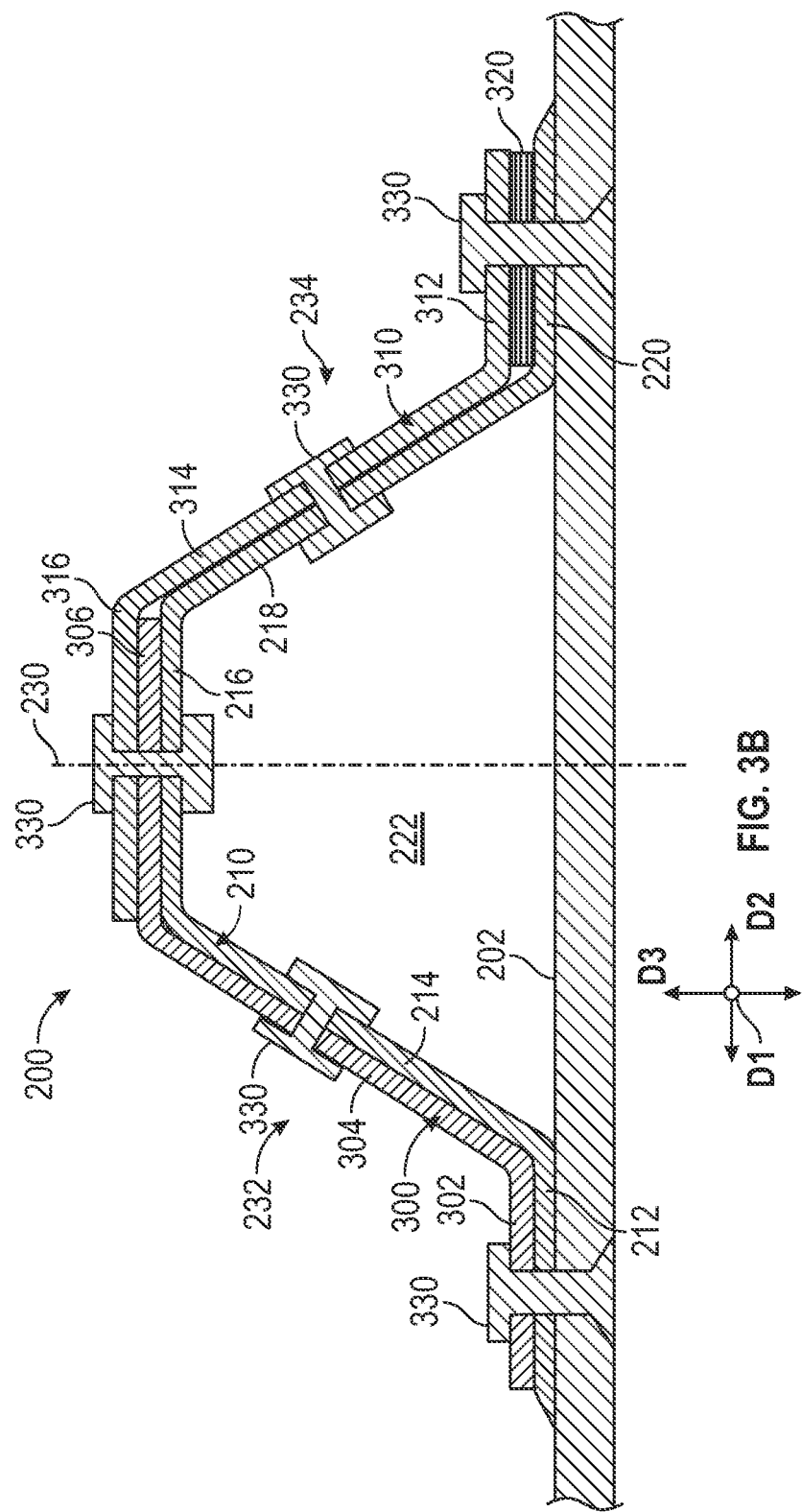

With reference now to FIGS. 3A and 3B, FIGS. 3A and 3B depict the hat stringer 200 of FIG. 2 undergoing a full stringer restoration with repair stringers having a "lazy Z" shape. Particularly, the base stringer 210 is in the process of undergoing full stringer restoration by using a first repair stringer 300 and a second repair stringer 310, which both have a lazy Z shape. The first and second repair stringers 300, 310 can both be formed of one or more plies, such as one or more carbon fiber plies. Full stringer restoration can be implemented in response to the base stringer 210 becoming damaged or otherwise structurally unsound.

As depicted in FIGS. 3A and 3B, the first repair stringer 300 has a flange segment 302, a web segment 304, and a cap segment 306. The web segment 304 extends between and connects the cap segment 306 and the flange segment 302. The flange segment 302 and the cap segment 306 both extend generally parallel to one another. The first repair stringer 300 has an internal profile 308 that matches at least a portion of the profile 224 of the internal cavity 222 defined by the hat stringer 200. In FIG. 3A, the internal profile 308 of the first repair stringer 300 is represented by a dashed line extending along the internal surface of the first repair stringer 300. Stated another way, the internal profile 308 of the first repair stringer 300 matches or is shaped complementary to at least a portion of an external surface of the stringer to which the first repair stringer 300 will be arranged adjacent. For instance, as depicted in FIG. 3A, the internal profile 308 of the first repair stringer 300 matches or is shaped complementary to at least a portion of the external surface 228 of the base stringer 210. In addition, a cross-sectional area of the first repair stringer 300 as viewed along the first direction D1 (e.g., a spanwise direction of a wing) is less than a total cross-sectional area of the hat stringer 200 as viewed along the first direction D1. In this regard, the first repair stringer 300 can be deemed to have a partial cross section with respect to the hat stringer 200.

The second repair stringer 310 has a flange segment 312, a web segment 314, and a cap segment 316. The web segment 314 extends between and connects the cap segment 316 and the flange segment 312. The flange segment 312 and the cap segment 316 both extend generally parallel to one another. Like the first repair stringer 300, the second repair stringer 310 has an internal profile 318 that matches at least a portion of the profile 224 of the internal cavity 222 defined by the hat stringer 200. In FIG. 3A, the internal profile 318 of the second repair stringer 310 is represented by a dashed line extending along the internal surface of the second repair stringer 310. Stated another way, the internal profile 318 of the second repair stringer 310 matches or is shaped complementary to at least a portion of an external surface of the stringer to which the second repair stringer 310 will be arranged adjacent. For instance, as depicted in FIG. 3A, the internal profile 318 of the second repair stringer 310 matches or is shaped complementary to at least a portion of the external surface 228 of the base stringer 210 and at least a portion of the external surface of the first repair stringer 300. Moreover, a cross-sectional area of the second repair stringer 310 as viewed along the first direction D1 is less than a total cross-sectional area of the hat stringer 200 as viewed along the first direction D1. In this regard, the second repair stringer 310 can be deemed to have a partial cross section with respect to the hat stringer 200.

Further, in the depicted example of FIGS. 3A and 3B, the first repair stringer 300 and the second repair stringer 310 have a same cross-sectional shape as viewed along the first direction D1. The second repair stringer 310 is oriented so as to be flipped horizontally with respect to the first repair stringer 300, or rather, the second repair stringer 310 is rotated one hundred eighty degrees (180°) about a rotation axis extending along the third direction D3 with respect to the first repair stringer 300.

For a full stringer restoration using repair stringers having a "lazy Z" shape, the full stringer restoration can be implemented by arranging the first repair stringer 300 in a first mounting location along the cross section of the hat stringer 200. For instance, as shown in FIG. 3A, the first repair stringer 300 is shown being arranged in a first mounting location as denoted by arrow 1. In the first mounting location, the first repair stringer 300 is arranged so that the flange segment 302, the web segment 304, and the cap segment 306 respectively confront or are respectively positioned adjacent to the first flange segment 212, the first web segment 214, and the cap segment 216 of the base stringer 210. The flange segment 302, the web segment 304, and the cap segment 306 of the first repair stringer 300 respectively extend parallel with the first flange segment 212, the first web segment 214, and the cap segment 216 of the base stringer 210 when the first repair stringer 300 is arranged in the first mounting location.

The full stringer restoration using repair stringers having a "lazy Z" shape can further be implemented by arranging the second repair stringer 310 in a second mounting location along the cross section of the hat stringer 200. For instance, as shown in FIG. 3A, the second repair stringer 310 is shown being arranged in a second mounting location as denoted by arrow 2. The flange segment 312, the web segment 314, and the cap segment 316 of the second repair stringer 310 respectively extend parallel with the second flange segment 220, the second web segment 218, and the cap segment 216 of the base stringer 210 when the second repair stringer 310 is arranged in the second mounting location. Moreover, in the second mounting location, the second repair stringer 310 is arranged so that the web segment 314 confronts or is positioned adjacent to the second web segment 218 of the base stringer 210 and so that the cap segment 316 confronts or is positioned adjacent to the cap segment 306 of the first repair stringer 300. In this regard, the cap segment 316 of the second repair stringer 310 physically overlaps the cap segment 306 of the first repair stringer 300. The cap segment 306 of the first repair stringer 300 and the cap segment 316 of the second repair stringer 310 each extend parallel with the cap segment 216 of the base stringer 210. Further, as depicted, the cap segment 306 of the first repair stringer 300 is sandwiched between the cap segment 316 of the second repair stringer 310 and the cap segment 216 of the base stringer 210, e.g., along the third direction D3.

As further shown in FIGS. 3A and 3B, the flange segment 312 of the second repair stringer 310 and the second flange segment 220 of the base stringer 210 are spaced from one another, e.g., along the third direction D3. Accordingly, a gap G or vertical offset is defined between the flange segment 312 of the second repair stringer 310 and the second flange segment 220 of the base stringer 210. The full stringer restoration using repair stringers having a "lazy Z" shape can further be implemented by placing one or more shims 320 between the second flange segment 220 of the base stringer 210 and the flange segment 312 of the second repair stringer 310. That is, one or more shims 320 can be arranged to fill in the gap G. For instance, as shown in FIG. 3A, the one or more shims 320 are shown being placed within the gap G as denoted by arrow 3. The added shims 320 can improve the structural integrity of the restored hat stringer 200. Further, notably, due to the shapes of the first and second repair stringers 300, 310 and the arrangement of them in their respective mounting locations, the need for shims on both sides of the hat stringer 200 can be eliminated or otherwise reduced. For example, in the example in FIG. 3A, no shims are needed between the flange segment 302 of the first repair stringer 300 and the first flange segment 212 of the base stringer 210.

The full stringer restoration using repair stringers having a "lazy Z" shape can further be implemented by coupling the first repair stringer 300 and the second repair stringer 310 with the base stringer 210 in their respective mounting locations. For instance, as shown in FIG. 3B, a plurality of fasteners 330 are used to couple the first and second repair stringers 300, 310 with the base stringer 210. One of the plurality of fasteners 330 can couple the flange segment 302 of the first repair stringer 300 with the first flange segment 212 of the base stringer 210. One of the plurality of fasteners 330 can couple the web segment 304 of the first repair stringer 300 with the first web segment 214 of the base stringer 210. One of the plurality of fasteners 330 can couple the cap segment 306 of the first repair stringer 300, the cap segment 316 of the second repair stringer 310, and the cap segment 216 of the base stringer 210 together. One of the plurality of fasteners 330 can couple the web segment 314 of the second repair stringer 310 with the second web segment 218 of the base stringer 210. Finally, one of the plurality of fasteners 330 can couple the flange segment 312 of the second repair stringer 310 with the second flange segment 220 of the base stringer 210. Any suitable type of fastener can be utilized, including but not limited to, rivets, bolts, screws, anchors, etc. In alternative example aspects, the first and second repair stringers 300, 310 can be coupled with the base stringer 210 in other manners, such as by a combination of compression and thermal processes.

With the first and second repair stringers 300, 310 coupled with the base stringer 210 as depicted in FIG. 3B, the hat stringer 200 can be deemed a restored or repaired hat stringer.

Notably, due at least in part to the geometric arrangement or cross-sectional shape of the first repair stringer 300, the first mounting location is one of a plurality of possible mounting locations along the cross section of the hat stringer 200 in which the first repair stringer 300 can be arranged. In each of the plurality of possible mounting locations, the internal profile 308 of the first repair stringer 300 matches the profile 224 of the internal cavity 222 defined by the hat stringer 200.

As a first example alternative mounting location, the first repair stringer 300 can be arranged so that the flange segment 302, the web segment 304, and the cap segment 306 respectively confront or are respectively positioned adjacent to the second flange segment 220, the second web segment 218, and the cap segment 216 of the base stringer 210. In such a first alternative mounting location, the flange segment 302, the web segment 304, and the cap segment 306 of the first repair stringer 300 can respectively extend parallel with the second flange segment 220, the second web segment 218, and the cap segment 216 of the base stringer 210. To arrange the first repair stringer 300 in the first alternative mounting location, the first repair stringer 300 can be flipped horizontally with respect to its orientation shown in FIGS. 3A and 3B (or rather, the first repair stringer 300 can be rotated from its orientation in FIGS. 3A and 3B one hundred eighty degrees (180°) about a rotation axis extending along the third direction D3). In the first alternative mounting location, the internal profile 308 of the first repair stringer 300 would still match the profile 224 of the internal cavity 222 defined by the hat stringer 200. Accordingly, the first repair stringer 300 is geometrically shaped to be mountable to the hat stringer 200 at least in a first possible mounting location in which the first repair stringer 300 is positioned primarily on the first side 232 of the hat stringer 200 (i.e., greater than fifty percent (50%) of the cross section of the first repair stringer 300 is positioned on the first side 232) and in a second possible mounting location in which the first repair stringer 300 is positioned primarily on the second side 234 of the hat stringer 200 (i.e., greater than fifty percent (50%) of the cross section of the first repair stringer 300 is positioned on the second side 234).

As a second example alternative mounting location, as shown in FIG. 3C, the first repair stringer 300 can be arranged so that the flange segment 302, the web segment 304, and the cap segment 306 of the first repair stringer 300 respectively extend parallel with, but do not contact, the first flange segment 212, the first web segment 214, and the cap segment 216 of the base stringer 210 when the first repair stringer 300 is arranged in the second alternative mounting location. Moreover, in the second alternative mounting location, the first repair stringer 300 is arranged so that the web segment 304 confronts or is positioned adjacent to a first web segment of another repair stringer 340 (e.g., a first existing repair stringer) and so that the cap segment 306 confronts or is positioned adjacent to the cap segment of yet another repair stringer 350 (e.g., a second existing repair stringer). In this regard, the cap segment 306 of the first repair stringer 300 physically overlaps, e.g., the cap segment of the second existing repair stringer 350. In the second alternative mounting location, the internal profile 308 of the first repair stringer 300 would still match the profile 224 of the internal cavity 222 defined by the hat stringer 200. Accordingly, the first repair stringer 300 is geometrically shaped to be mountable to the hat stringer 200 in a mounting location in which the first repair stringer 300 is stacked on other stringers (e.g., existing repair stringers) that are not the base stringer 210.

As a third example alternative mounting location, the first repair stringer 300 can be arranged in the second mounting location, or rather, the mounting location in which the second repair stringer 310 is located in FIGS. 3A and 3B and the second repair stringer 310 can be mounted in another mounting location of a plurality of possible mounting locations. Accordingly, like the first repair stringer 300, the second repair stringer 310 can likewise be mountable in a plurality of possible positions as will be appreciated by the teachings above.

In some example aspects, in each of the plurality of possible mounting locations in which the first repair stringer 300 can possibly be mounted, the web segment 304 of the first repair stringer 300 extends parallel with a web segment of the base stringer 210. Stated differently, in some example aspects, in each of the plurality of possible mounting locations in which the first repair stringer 300 can possibly be mounted, the internal surface of the web segment 304 of the first repair stringer 300 extends parallel with a web portion of the profile 224. The same is true for the second repair stringer 310. That is, in each of the plurality of possible mounting locations in which the second repair stringer 310 can possibly be mounted, the web segment 314 of the second repair stringer 310 extends parallel with a web segment of the base stringer 210. Stated differently, in some example aspects, in each of the plurality of possible mounting locations in which the second repair stringer 310 can possibly be mounted, the internal surface of the web segment 314 of the second repair stringer 310 extends parallel with a web portion of the profile 224.

In yet other example aspects, in each of the plurality of possible mounting locations in which the first repair stringer 300 can possibly be mounted, the cap segment 306 of the first repair stringer 300 extends parallel with the cap segment 216 of the base stringer 210 and the flange segment 302 of the first repair stringer 300 extends parallel with a flange segment of the base stringer 210. The same is true for the second repair stringer 310. Specifically, in each of the plurality of possible mounting locations in which the second repair stringer 310 can possibly be mounted, the cap segment 316 of the second repair stringer 310 extends parallel with the cap segment 216 of the base stringer 210 and the flange segment 312 of the second repair stringer 310 extends parallel with a flange segment of the base stringer 210.

Restoring a hat stringer with one or more repair stringers each having a lazy Z cross-sectional shape can present certain advantages. For instance, the partial cross section of the lazy Z shape allows for repair stringers to be mounted in a plurality of mounting locations along the cross section of the hat stringer, which provides flexibility in the repair process. Further, the shimming needed for the repair can be reduced compared to conventional techniques. For example, in FIG. 3B, shims 320 are needed on only one side of the hat stringer as the flange segment 302 of the first repair stringer 300 can be arranged directly on or adjacent the first flange segment 212 of the base stringer 210. Also, a repair stringer having a lazy Z cross-sectional shape includes three segments that are capable of contacting three corresponding segments of one or more other stringers. The three points of contact can provide structural stability to a repaired hat stringer. Further, a restoration of a hat stringer with a plurality of lazy Z-shaped repair stringers is advantageous in that such hat stringers can be stacked (e.g., as shown in FIG. 3C) without need to change the shape or angle of the repair stringers, which can greatly reduce or eliminate the need for custom repair stringers for a stacked arrangement. Stated differently, a plurality of same shaped lazy Z repair stringers can be used for a stacked repair. Such an advantage can improve the ease of performing the repair process for operators and stocking and storing repair parts, among other benefits.

Figure 4A:
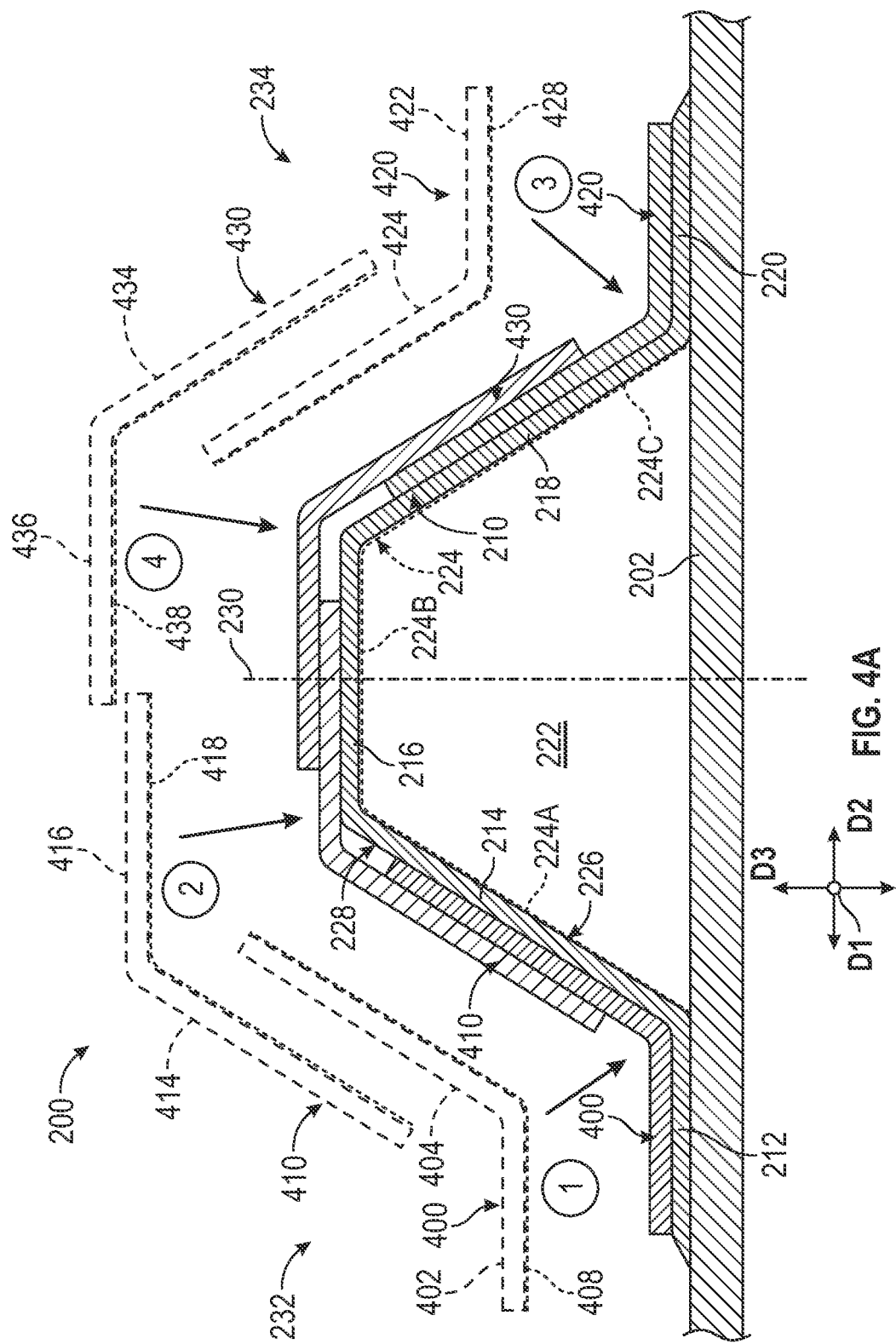

With reference now to FIGS. 4A and 4B, FIGS. 4A and 4B depict the hat stringer 200 of FIG. 2 undergoing a full stringer restoration with repair stringers having a "lazy L" shape. Particularly, the base stringer 210 is in the process of undergoing full stringer restoration by using a first repair stringer 400, a second repair stringer 410, a third repair stringer 420, and a fourth repair stringer 430, which all have a lazy L shape, or rather, a lazy L cross section as viewed along the first direction D1. The first, second, third, and fourth repair stringers 400, 410, 420, 430 can each be formed of one or more plies, such as one or more carbon fiber plies. Full stringer restoration can be implemented in response to the base stringer 210 becoming damaged or otherwise structurally unsound.

As depicted in FIGS. 4A and 4B, generally, the first, second, third, and fourth repair stringers 400, 410, 420, 430 each include a web segment and a second segment, which can be flange segment or a cap segment depending on the orientation of the repair stringer. The second segment of a given repair stringer is non-parallel with its web segment. An obtuse angle is defined between the web segment and the second segment of respective ones of the first, second, third, and fourth repair stringers 400, 410, 420, 430. Particularly, as shown, the first repair stringer 400 has a web segment 404 and a second segment, which is a flange segment 402 in this example. The second repair stringer 410 has a web segment 414 and a second segment, which is a cap segment 416 in this example. The third repair stringer 420 has a web segment 424 and a second segment, which is a flange segment 422 in this example. The fourth repair stringer 430 has a web segment 434 and a second segment, which is a cap segment 436 in this example.

The first repair stringer 400 has an internal profile 408 that matches at least a portion of the profile 224 of the internal cavity 222 defined by the hat stringer 200. In FIG. 4A, the internal profile 408 of the first repair stringer 400 is represented by a dashed line extending along the internal surface of the first repair stringer 400. As depicted, the internal profile 408 of the first repair stringer 400 matches or is shaped complementary to at least the first web portion 224A of the profile 224. Stated another way, the internal profile 408 of the first repair stringer 400 matches or is shaped complementary to at least a portion of an external surface of the stringer (or stringers) to which the first repair stringer 400 will be arranged adjacent. For instance, as depicted in FIG. 4A, the internal profile 408 of the first repair stringer 400 matches or is shaped complementary to at least a portion of the external surface 228 of the base stringer 210.

The second repair stringer 410 has an internal profile 418 that matches at least a portion of the profile 224 of the internal cavity 222 defined by the hat stringer 200. In FIG. 4A, the internal profile 418 of the second repair stringer 410 is represented by a dashed line extending along the internal surface of the second repair stringer 410. As illustrated, the internal profile 418 of the second repair stringer 410 matches or is shaped complementary to at least the first web portion 224A and the cap portion 224B of the profile 224. Stated differently, the internal profile 418 of the second repair stringer 410 matches or is shaped complementary to at least a portion of an external surface of the stringer (or stringers) to which the second repair stringer 410 will be arranged adjacent. For instance, as depicted in FIG. 4A, the internal profile 418 of the second repair stringer 410 matches or is shaped complementary to at least a portion of the external surface 228 of the base stringer 210 along the cap segment 216 and to at least a portion of the external surface of the first repair stringer 400.

The third repair stringer 420 has an internal profile 428 that matches at least a portion of the profile 224 of the internal cavity 222 defined by the hat stringer 200. In FIG. 4A, the internal profile 428 of the third repair stringer 420 is represented by a dashed line extending along the internal surface of the third repair stringer 420. As depicted, the internal profile 428 of the third repair stringer 420 matches or is shaped complementary to at least the second web portion 224C of the profile 224. Stated another way, the internal profile 428 of the third repair stringer 420 matches or is shaped complementary to at least a portion of an external surface of the stringer (or stringers) to which the third repair stringer 420 will be arranged adjacent. For instance, as depicted in FIG. 4A, the internal profile 428 of the third repair stringer 420 matches or is shaped complementary to at least a portion of the external surface 228 of the base stringer 210.

The fourth repair stringer 430 has an internal profile 438 that matches at least a portion of the profile 224 of the internal cavity 222 defined by the hat stringer 200. In FIG. 4A, the internal profile 438 of the fourth repair stringer 430 is represented by a dashed line extending along the internal surface of the fourth repair stringer 430. As illustrated, the internal profile 438 of the fourth repair stringer 430 matches or is shaped complementary to at least the second web portion 224C and the cap portion 224B of the profile 224. Stated differently, the internal profile 438 of the fourth repair stringer 430 matches or is shaped complementary to at least a portion of an external surface of the stringer (or stringers) to which the fourth repair stringer 430 will be arranged adjacent. For instance, as depicted in FIG. 4A, the internal profile 438 of the fourth repair stringer 430 matches or is shaped complementary to at least a portion of the external surface of the third repair stringer 420 and to at least a portion of the external surface of the second repair stringer 410.

Further, in the depicted example of FIGS. 4A and 4B, a cross-sectional area of the first repair stringer 400 as viewed along the first direction D1 (e.g., a spanwise direction of a wing) is less than a total cross-sectional area of the hat stringer 200 as viewed along the first direction D1. The same is true for the second, third, and fourth repair stringers 410, 420, 430. Accordingly, the first, second, third, and fourth repair stringers 400, 410, 420, 430 can each be deemed to have a partial cross section with respect to the hat stringer 200.

Moreover, in some example aspects, such as in the example of FIGS. 4A and 4B, the first, second, third, and fourth repair stringers 400, 410, 420, 430 can each have a same cross-sectional shape as one another as viewed along the first direction D1. In FIGS. 4A and 4B, the second repair stringer 410 is oriented so as to be flipped vertically with respect to the first repair stringer 400, or rather, the second repair stringer 410 is rotated one hundred eighty degrees (180°) about a rotation axis extending along the second direction D2 with respect to the first repair stringer 400. The third repair stringer 420 is oriented so as to be flipped horizontally with respect to the first repair stringer 400, or rather, the third repair stringer 420 is rotated one hundred eighty degrees (180°) about a rotation axis extending along the third direction D3 with respect to the first repair stringer 400. The fourth repair stringer 430 is oriented so as to be flipped vertically and horizontally with respect to the first repair stringer 400, or rather, the fourth repair stringer 430 is rotated one hundred eighty degrees (180°) about a rotation axis extending along the third direction D3 with respect to the first repair stringer 400 for the horizontal flip and the fourth repair stringer 430 is rotated one hundred eighty degrees (180°) about a rotation axis extending along the second direction D2 with respect to the first repair stringer 400 for the vertical flip.

For a full stringer restoration using repair stringers having a "lazy L" shape, the full stringer restoration can be implemented by arranging the first repair stringer 400 in a first mounting location along the cross section of the hat stringer 200. For instance, as shown in FIG. 4A, the first repair stringer 400 is shown being arranged in a first mounting location as denoted by arrow 1. In the first mounting location, the first repair stringer 400 is arranged so that the flange segment 402 and the web segment 404 respectively confront or are respectively positioned adjacent to the first flange segment 212 and the first web segment 214 of the base stringer 210. The flange segment 402 and the web segment 404 of the first repair stringer 400 respectively extend parallel with the first flange segment 212 and the first web segment 214 of the base stringer 210 when the first repair stringer 400 is arranged in the first mounting location.

The full stringer restoration using repair stringers having a "lazy L" shape can further be implemented by arranging the second repair stringer 410 in a second mounting location along the cross section of the hat stringer 200. For instance, as shown in FIG. 4A, the second repair stringer 410 is shown being arranged in a second mounting location as denoted by arrow 2. In the second mounting location, the second repair stringer 410 is arranged so that the web segment 414 and the cap segment 416 of the second repair stringer 410 respectively extend parallel with the first web segment 214 and the cap segment 216 of the base stringer 210. Moreover, in the second mounting location, the second repair stringer 410 is arranged so that the web segment 414 confronts or is positioned adjacent to the web segment 404 of the first repair stringer 400. In this regard, the web segment 414 of the second repair stringer 410 physically overlaps the web segment 404 of the first repair stringer 400, with the web segment 404 being sandwiched or positioned between the web segment 414 and the first web segment 214 of the base stringer 210. Further, in the second mounting location, the second repair stringer 410 is arranged so that the cap segment 416 confronts or is positioned adjacent to the cap segment 216 of the base stringer 210.

The full stringer restoration using repair stringers having a "lazy L" shape can further be implemented by arranging the third repair stringer 420 in a third mounting location along the cross section of the hat stringer 200. For instance, as shown in FIG. 4A, the third repair stringer 420 is shown being arranged in a third mounting location as denoted by arrow 3. In the third mounting location, the third repair stringer 420 is arranged so that the flange segment 422 and the web segment 424 respectively confront or are respectively positioned adjacent to the second flange segment 220 and the second web segment 218 of the base stringer 210. The flange segment 422 and the web segment 424 of the third repair stringer 420 respectively extend parallel with the second flange segment 220 and the second web segment 218 of the base stringer 210 when the third repair stringer 420 is arranged in the third mounting location.

The full stringer restoration using repair stringers having a "lazy L" shape can further be implemented by arranging the fourth repair stringer 430 in a fourth mounting location along the cross section of the hat stringer 200. For instance, as shown in FIG. 4A, the fourth repair stringer 430 is shown being arranged in a fourth mounting location as denoted by arrow 4. In the fourth mounting location, the fourth repair stringer 430 is arranged so that the web segment 434 and the cap segment 436 of the fourth repair stringer 430 respectively extend parallel with the second web segment 218 and the cap segment 216 of the base stringer 210. Moreover, in the fourth mounting location, the fourth repair stringer 430 is arranged so that the web segment 434 confronts or is positioned adjacent to the web segment 424 of the third repair stringer 420. In this regard, the web segment 434 of the fourth repair stringer 430 physically overlaps the web segment 424 of the third repair stringer 420, with the web segment 424 being sandwiched or positioned between the web segment 434 and the second web segment 218 of the base stringer 210. Further, in the fourth mounting location, the fourth repair stringer 430 is arranged so that the cap segment 436 confronts or is positioned adjacent to the cap segment 416 of the second repair stringer 410. The cap segment 436 of the fourth repair stringer 430 is spaced from the cap segment 216 of the base stringer 210, e.g., along the third direction D3.

The full stringer restoration using repair stringers having a "lazy L" shape can further be implemented by coupling the first, second, third, and fourth repair stringers 400, 410, 420, 430 with the base stringer 210 in their respective mounting locations. For instance, as shown in FIG. 4B, a plurality of fasteners 440 are used to couple the first, second, third, and fourth repair stringers 400, 410, 420, 430 with the base stringer 210. One of the plurality of fasteners 440 can couple the flange segment 402 of the first repair stringer 400 with the first flange segment 212 of the base stringer 210. One of the plurality of fasteners 440 can couple the web segment 404 of the first repair stringer 400, the web segment 414 of the second repair stringer 410, and the first web segment 214 of the base stringer 210. One of the plurality of fasteners 440 can couple the cap segment 416 of the second repair stringer 410, the cap segment 436 of the third repair stringer 430, and the cap segment 216 of the base stringer 210. One of the plurality of fasteners 440 can couple the web segment 424 of the third repair stringer 420, the web segment 434 of the fourth repair stringer 430, and the second web segment 218 of the base stringer 210. Finally, one of the plurality of fasteners 440 can couple the flange segment 422 of the third repair stringer 420 with the second flange segment 220 of the base stringer 210. Any suitable type of fastener can be utilized, including but not limited to, rivets, bolts, screws, anchors, etc. In alternative example aspects, the first, second, third, and/or fourth repair stringers 400, 410, 420, 430 can be coupled with the base stringer 210 in other manners, such as by a combination of compression and thermal processes.

With the first, second, third, and fourth repair stringers 400, 410, 420, 430 coupled with the base stringer 210 as depicted in FIG. 4B, the hat stringer 200 can be deemed a restored or repaired hat stringer.

Notably, due at least in part to the geometric arrangement or cross-sectional shape of the first repair stringer 400, the first mounting location is one of a plurality of possible mounting locations along the cross section of the hat stringer 200 in which the first repair stringer 400 can be arranged. In each of the plurality of possible mounting locations, the internal profile 408 of the first repair stringer 400 matches at least a portion of the profile 224 of the internal cavity 222 defined by the hat stringer 200. For instance, the first repair stringer 400 can be flipped vertically and/or horizontally to be mounted in any one of the mounting locations in which the second, third, and/or fourth repair stringers are shown in FIGS. 4A and 4B, and in any of these other possible mounting locations, the internal profile of the first repair stringer 400 matches or is shaped complementary to at least a portion of the profile 224 of the internal cavity 222. The same is true for the second repair stringer 410, the third repair stringer 420, and the fourth repair stringer 430. In this way, each one of the first, second, third, and fourth repair stringers 400, 410, 420, 430 are mountable in a plurality of mounting locations along the cross section of the hat stringer 200.

Restoring a hat stringer with one or more repair stringers each having a lazy L cross-sectional shape can present certain advantages. For instance, the partial cross section of the lazy L shape allows for repair stringers to be mounted in a plurality of mounting locations along the cross section of the hat stringer, which provides flexibility in the repair process. Further, the shimming needed for the repair can be eliminated or otherwise significantly reduced. For example, in FIG. 4B, no shimming is needed to restore the hat stringer. Also, a repair stringer having a lazy L cross-sectional shape includes two segments that are capable of contacting two corresponding segments of one or more other stringers. The two points of contact can provide structural stability to a repaired hat stringer. Further, a restoration of a hat stringer with a plurality of lazy L-shaped repair stringers is advantageous in that such hat stringers can be stacked without need to change the shape or angle of the repair stringers, which can greatly reduce or eliminate the need for custom repair stringers for a stacked arrangement. Such an advantage can improve the ease of performing the repair process for operators and stocking and storing repair parts, among other benefits.

FIG. 4C is a cross-sectional view of another hat stringer undergoing a full stringer restoration with repair stringers having a "lazy Z" shape and one repair stringer having a "lazy U" shape. Particularly, the base stringer 210 is in the process of undergoing full stringer restoration by using a first repair stringer 400, a second repair stringer 420 (configured and oriented in a similar manner as the third repair stringer 420 of FIGS. 4A and 4B), and a third repair stringer 450. The first and second repair stringers 400, 420 both have a lazy L shape, or rather, a lazy L cross section as viewed along the first direction D1. The third repair stringer 450 has a lazy U shape, or rather, a lazy U cross section as viewed along the first direction D1. The third repair stringer 450 can be arranged in an upside orientation or as an upside-down lazy U, e.g., as shown in FIG. 4C. The first, second, and third repair stringers 400, 420, 450 can each be formed of one or more plies, such as one or more carbon fiber plies. Full stringer restoration can be implemented in response to the base stringer 210 becoming damaged or otherwise structurally unsound.

The first and second repair stringers 400, 420 can be arranged as described above with reference to FIGS. 4A and 4B. The third repair stringer 450 includes a first web segment 454, a cap segment 456, and a second web segment 458. The cap segment 456 extends between and connects the first web segment 454 and the second web segment 458. A first obtuse angle is defined between the first web segment 454 and the cap segment 456. A second obtuse angle is defined between the second web segment 458 and the cap segment 456. In FIG. 4C, the third repair stringer 450 does not include flange segments.

The third repair stringer 450 has an internal profile 460 that matches at least a portion of the profile 224 of the internal cavity 222 defined by the hat stringer 200. In FIG. 4C, the internal profile 460 of the third repair stringer 450 is represented by a dashed line extending along the internal surface of the third repair stringer 450. As depicted, the internal profile 460 of the third repair stringer 450 matches or is shaped complementary to the first web portion 224A, the cap portion 224B, and the second web portion 224C of the profile 224. Stated another way, the internal profile 460 of the third repair stringer 450 matches or is shaped complementary to an external surface of the stringer (or stringers) to which the third repair stringer 450 will be arranged adjacent. For instance, as depicted in FIG. 4C, the internal profile 460 of the third repair stringer 450 matches or is shaped complementary to at least a portion of the external surface of the first repair stringer 400, at least a portion of the external surface of the baseline stringer 210, and at least a portion of the external surface of the second repair stringer 420.

Accordingly, a repair stringer having a lazy U shape can be arranged so that a first web segment thereof couples to a web segment of one repair stringer, a cap segment thereof couples to and spans the full length of a cap segment of a baseline stringer, and a second web segment thereof couples to a web segment of another repair stringer. Such an arrangement can provide advantageous structurally integrity at the cap and web segments of the repaired hat stringer, among other benefits.

With reference now to FIG. 5, FIG. 5 depicts the hat stringer 200 of FIG. 2 undergoing a partial stringer restoration with at least one repair stringer having a "lazy L" shape. Particularly, the base stringer 210 is in the process of undergoing partial stringer restoration by using a single repair stringer (in this example a first repair stringer 500), which has a lazy L shape, or rather, a lazy L cross section as viewed along the first direction D1. The first repair stringer 500 can be formed of one or more plies, such as one or more carbon fiber plies. Partial stringer restoration can be implemented in response to the base stringer 210 becoming damaged or otherwise structurally unsound, e.g., as represented by a damaged portion 204 in FIG. 5. The damaged portion 204 is located at the transition between the first flange segment 212 and the first web segment 214 in this example but may be located in other areas along the cross section of the hat stringer 200 in other instances. Moreover, in some alternative example aspects, a repair stringer having a "lazy Z" shape can be used for a partial stringer restoration.

As depicted in FIG. 5, like the repair stringers 400, 410, 420, 430 of FIGS. 4A and 4B, the first repair stringer 500 includes a first segment (e.g., a web segment) and a second segment, which can be flange segment or a cap segment depending on the orientation of the first repair stringer 500. The second segment of the first repair stringer 500 is non-parallel with its first segment. An obtuse angle is defined between the first segment and the second segment of the first repair stringer 500. In the example of FIG. 5, the first segment of the first repair stringer 500 is a web segment 504 and the second segment is a flange segment 502.

The first repair stringer 500 has an internal profile 508 that matches at least a portion of the profile 224 of the internal cavity 222 defined by the hat stringer 200. In FIG. 5, the internal profile 508 of the first repair stringer 500 is represented by a dashed line extending along the internal surface of the first repair stringer 500. As depicted, the internal profile 508 of the first repair stringer 500 matches or is shaped complementary to at least the first web portion 224A of the profile 224. Stated another way, the internal profile 508 of the first repair stringer 500 matches or is shaped complementary to at least a portion of an external surface of the stringer (or stringers) to which the first repair stringer 500 will be arranged adjacent. For instance, as depicted in FIG. 5, the internal profile 508 of the first repair stringer 500 matches or is shaped complementary to at least a portion of the external surface 228 of the base stringer 210. Further, in the depicted example of FIG. 5, a cross-sectional area of the first repair stringer 500 as viewed along the first direction D1 (e.g., a spanwise direction of a wing) is less than a total cross-sectional area of the hat stringer 200 as viewed along the first direction D1.

For a partial stringer restoration using a repair stringer having a "lazy L" shape, the partial stringer restoration can be implemented by arranging the first repair stringer 500 in a first mounting location along the cross section of the hat stringer 200. For instance, as shown in FIG. 5, the first repair stringer 500 is shown being arranged in a first mounting location as denoted by arrow 1. In the first mounting location, the first repair stringer 500 is arranged so that the flange segment 502 and the web segment 504 respectively confront or are respectively positioned adjacent to the first flange segment 212 and the first web segment 214 of the base stringer 210. The flange segment 502 and the web segment 504 of the first repair stringer 500 respectively extend parallel with the first flange segment 212 and the first web segment 214 of the base stringer 210 when the first repair stringer 500 is arranged in the first mounting location.

The partial stringer restoration using a repair stringer having a "lazy L" shape can further be implemented by coupling the first repair stringer 500 with the base stringer 210 in the first mounting location. For instance, as shown in FIG. 5, a plurality of fasteners 520 are used to couple the first repair stringer 500 with the base stringer 210. One of the plurality of fasteners 520 can couple the flange segment 502 of the first repair stringer 500 with the first flange segment 212 of the base stringer 210. One of the plurality of fasteners 520 can couple the web segment 504 of the first repair stringer 500 and the first web segment 214 of the base stringer 210. Any suitable type of fastener can be utilized, including but not limited to, rivets, bolts, screws, anchors, etc. In alternative example aspects, the first repair stringer 500 can be coupled with the base stringer 210 in other manners, such as by a combination of compression and thermal processes. With the first repair stringer 500 coupled with the base stringer 210 as depicted in FIG. 5, the hat stringer 200 can be deemed a restored or repaired hat stringer.

Notably, due at least in part to the geometric arrangement or cross-sectional shape of the first repair stringer 500, the first mounting location is one of a plurality of possible mounting locations along the cross section of the hat stringer 200 in which the first repair stringer 500 can be arranged. In each of the plurality of possible mounting locations, the internal profile 508 of the first repair stringer 500 matches at least a portion of the profile 224 of the internal cavity 222 defined by the hat stringer 200. The first repair stringer 500 can be flipped vertically and/or horizontally to be mounted in another possible mounting location.

As one example, the first repair stringer 500 can be flipped horizontally and arranged so that the web segment 504 and the flange segment 502 are respectively aligned parallel with the second web segment 218 and the second flange segment 220 of the base stringer 210, e.g., to restore damage to a transition between the second web segment 218 and the second flange segment 220 of the base stringer 210. As another example, the first repair stringer 500 can be flipped vertically and arranged so that the web segment 504 and its second segment are respectively aligned parallel with the first web segment 214 and the cap segment 216 of the base stringer 210, e.g., to restore damage to a transition between the first web segment 214 and the cap segment 216 of the base stringer 210. As yet another example, the first repair stringer 500 can be flipped both vertically and horizontally and arranged so that the web segment 504 and its second segment are respectively aligned parallel with the second web segment 218 and the cap segment 216 of the base stringer 210, e.g., to restore damage to a transition between the second web segment 218 and the cap segment 216 of the base stringer 210. In any of the possible mounting locations, the internal profile of the first repair stringer 500 matches or is shaped complementary to at least a portion of the profile 224 of the internal cavity 222.

Partially restoring a hat stringer with a repair stringer disclosed herein, such a repair stringer having a lazy L cross-sectional shape or a lazy Z cross-sectional shape, can present certain advantages. For instance, the repair stringers of the present disclosure have a partial cross section with respect to the total cross section of the hat stringer, which allows for a repair stringer to be strategically arranged or localized to the damaged section of the hat stringer. This allows for less material to be used for the repair, which may advantageously reduce the weight of the aircraft.

Figure 6A:
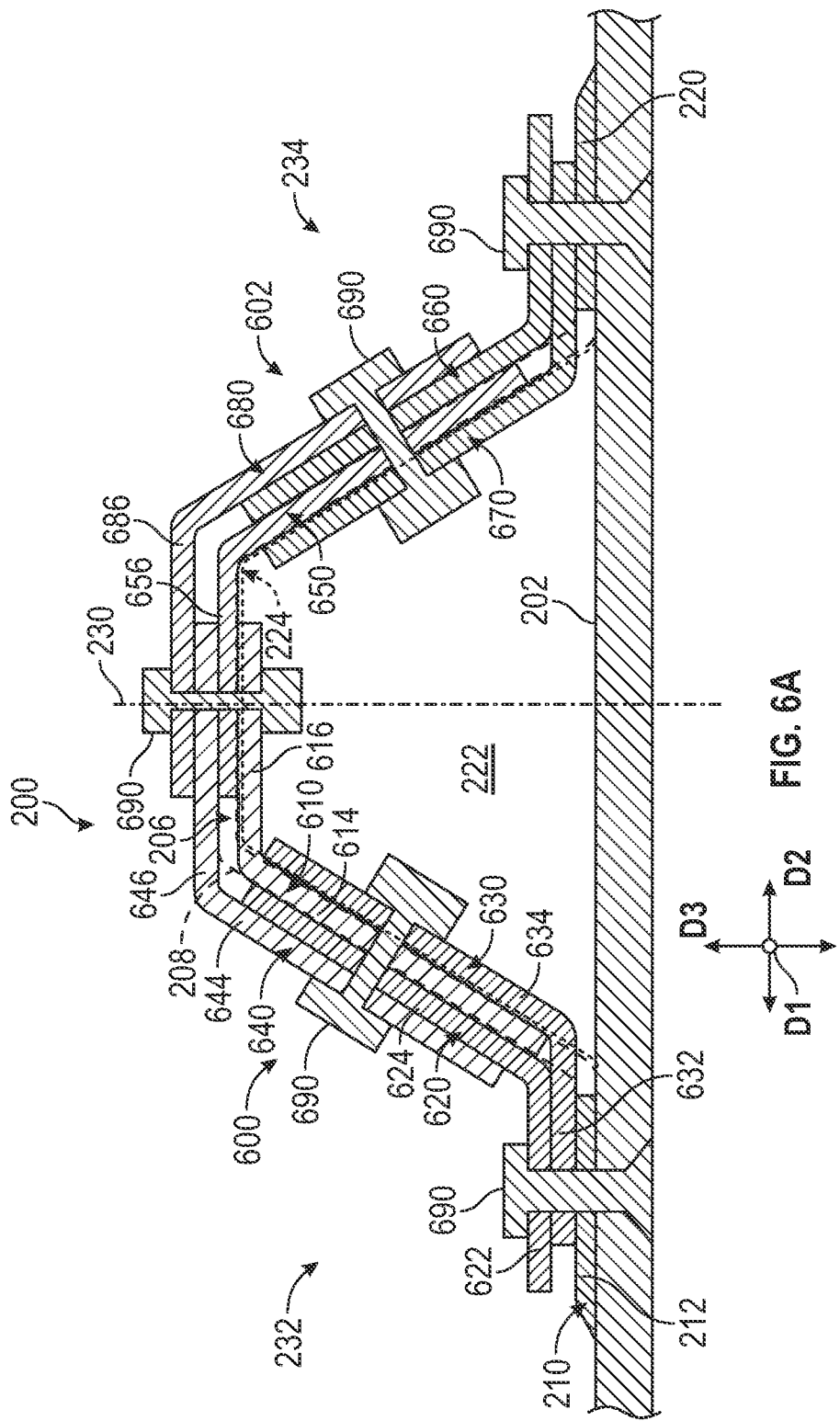
FIG. 6A is a cross-sectional view of a hat stringer undergoing a segment splice restoration.

With reference now to FIG. 6A, FIG. 6A depicts the hat stringer 200 of FIG. 2 undergoing a splice restoration with repair stringers having a "lazy L" shape. Particularly, the base stringer 210 is in the process of undergoing a splice restoration by plurality of strategically arranged and oriented repair stringers, including a first set 600 of repair stringers arranged primarily at the first side 232 and a second set 602 of repair stringers arranged primarily at the second side 234 of the hat stringer 200 in need of splice restoration. The first set 600 includes a first repair stringer 610, a second repair stringer 620, a third repair stringer 630, and a fourth repair stringer 640. The first, second, third, and fourth repair stringers 610, 620, 630, 640 are each shaped to have an internal profile that matches at least a portion of the profile 224 of the internal cavity 222 defined by the hat stringer 200, regardless of their respective mounting positions or orientations. In some aspects, the first, second, third, and fourth repair stringers 610, 620, 630, 640 all have a same cross-sectional shape as one another, e.g., as viewed along the first direction D1, which can be a spanwise direction along a wing of an aircraft.

The second set 602 includes a first repair stringer 650, a second repair stringer 660, a third repair stringer 670, and a fourth repair stringer 680. The repair stringers 610, 620, 630, 640, 650, 660, 670, 680 (or 610-680) can each be formed of one or more plies, such as one or more carbon fiber plies. The first, second, third, and fourth repair stringers 650, 660, 670, 680 are each shaped to have an internal profile that matches at least a portion of the profile 224 of the internal cavity 222 defined by the hat stringer 200, regardless of their respective mounting positions or orientations. In some aspects, the first, second, third, and fourth repair stringers 650, 660, 670, 680 all have a same cross-sectional shape as one another, e.g., as viewed along the first direction D1, which can be a spanwise direction along a wing of an aircraft.

A splice restoration can be implemented in response to the base stringer 210 becoming damaged with a missing section, such as the missing section 206 depicted in FIG. 6A. In the example of FIG. 6A, the first web segment, the cap segment, and the second web segment of the base stringer 210 are missing and thus collectively form the missing section 206 or void in the base stringer 210. A plane 208 can be defined where the missing section 206 of the base stringer 210 was previously positioned. The plane 208 is defined by dashed lines in FIG. 6A.

For a splice restoration using repair stringers having a "lazy L" shape, the splice restoration can be implemented by constructing the first set 600 of repair stringers. Particularly, constructing the first set 600 can include arranging the first repair stringer 610 so that a segment (e.g., a web segment 614) of the first repair stringer 610 is positioned in or adjacent the plane 208 where the missing section 206 of the base stringer 210 was previously positioned. In FIG. 6A, the web segment 614 of the first repair stringer 610 is positioned, at least in part, in the plane 208 where the first web segment of the base stringer 210 was previously positioned.

Constructing the first set 600 can further include arranging the second repair stringer 620 and the third repair stringer 630 so that segments of the second repair stringer 620 and the third repair stringer 630 (e.g., a web segment 624 of the second repair stringer 620 and a web segment 634 of the third repair stringer 630) sandwich the segment (e.g., a web segment 614) of the first repair stringer 610 positioned within the plane 208. As depicted in FIG. 6A, the third repair segment 630 has a flange segment 632 that confronts or is positioned adjacent to the first flange segment 212 of the base stringer 210. The second repair segment 620 has a flange segment 622 that confronts or is positioned adjacent to the flange segment 632 of the third repair segment 630. The flange segments 622, 632 are arranged relative to the first flange segment 212 so that a space or gap is defined between the web segments 624, 634. The gap between the web segments 624, 634 is sized so that the web segment 614 of the first repair segment 610 can be received therein, or rather, so that the web segment 614 can be sandwiched therebetween. Positioning the web segment 614 between the web segments 624, 634 can advantageously enhance the structural integrity of the hat stringer 200.

Constructing the first set 600 of repair stringers along the first side 232 can further include arranging the fourth repair stringer 640 so that a segment (e.g., a web segment 644) of the fourth repair stringer 640 and a segment (e.g., the web segment 614) of the first repair stringer 610 sandwich the second repair stringer 620 (e.g., the web segment 624. As shown in FIG. 6A, the first repair stringer 610 and the fourth repair stringer 640 are arranged so as to define a space or gap between their respective web segments 614, 644. The gap between the web segments 614, 644 is sized so that the web segment 624 of the second repair segment 620 can be received therein, or rather, so that the web segment 624 can be sandwiched therebetween. Positioning the web segment 624 between the web segments 614, 644 can advantageously enhance the structural integrity of the hat stringer 200.

As illustrated in FIG. 6A, with the first, second, third, and fourth repair stringers 610, 620, 630, 640 arranged as noted above, the second and third repair stringers 620, 630 have a same mounting orientation and the first and fourth repair stringers 610, 640 have a same mounting orientation. As shown, the second and third repair stringers 620, 630 are oriented so as to be flipped vertically and horizontally with respect to the first and fourth repair stringers 610, 640.

Constructing the first set 600 of repair stringers along the first side 232 can further include coupling the first, second, third, and fourth repair stringers 610, 620, 630, 640 with the base stringer 210. For instance, as shown in FIG. 6A, a plurality of fasteners 690 are used to couple the first, second, third, and fourth repair stringers 610, 620, 630, 640 of the first set 600 with the base stringer 210. One of the plurality of fasteners 690 can couple the flange segment 622 of the second repair stringer 620 and the flange segment 632 of the third repair stringer 630 with the first flange segment 212 of the base stringer 210. One of the plurality of fasteners 690 can couple the web segments 614, 624, 634, 644 of the first, second, third, and fourth repair stringers 610, 620, 630, 640. As the first and fourth repair stringers 610, 640 are coupled with the second and third repair stringers 620, 630, which are coupled with the base stringer 210, the first and fourth repair stringers 610, 640 are consequently also coupled with the base stringer 210. Any suitable type of fastener can be utilized, including but not limited to, rivets, bolts, screws, anchors, etc. In alternative example aspects, the first, second, third, and/or fourth repair stringers 610, 620, 630, 640 of the first set 600 can be coupled with the base stringer 210 in other manners, such as by a combination of compression and thermal processes.

With the first, second, third, and/or fourth repair stringers 610, 620, 630, 640 of the first set 600 arranged in place and coupled with the base stringer 210, the first set 600 can be deemed to repair the first web segment and a first portion of the cap segment of the base stringer 210.

The splice restoration can further be implemented by constructing the second set 602 of repair stringers. Particularly, constructing the second set 602 can include arranging the first, second, third, and fourth repair stringers 650, 660, 670, 680 as described above with respect to the first set 600, and also coupling them to the base stringer 210, e.g., to the second flange segment 220 thereof.

With the first repair stringer 610 and the fourth repair stringer 640 of the first set 600 arranged as noted above, a gap is defined between their respective cap segments 616, 646. For the example of FIG. 6A, the gap defined between the cap segments 616, 646 is arranged along the plane 208 of where the missing section 206 of the base stringer 210 was previously positioned. The gap is sized (e.g., along the third direction D3) so as to be capable of receiving a portion of another repair stringer, e.g., a cap segment 656 of the first repair stringer 650 from the second set 602 as shown in FIG. 6A. Further, with the first repair stringer 650 and the fourth repair stringer 680 of the second set 602 arranged as noted above, a gap is defined between their respective cap segments 656, 686. For the example of FIG. 6A, the gap defined between the cap segments 616, 646 is arranged along the plane 208 of where the missing section 206 of the base stringer 210 was previously positioned. The gap is sized (e.g., along the third direction D3) so as to be capable of receiving a portion of another repair stringer, e.g., the cap segment 646 of the fourth repair stringer 640 from the first set 600 as shown in FIG. 6A.

As further depicted in FIG. 6A, an internal surface of the cap segment 686 of the fourth repair stringer 680 of the second set 602 confronts or is positioned adjacent to an external surface of the cap segment 646 of the fourth repair stringer 640 of the first set 600. In this regard, the cap segment 686 of the fourth repair stringer 680 of the second set 602 physically overlaps the cap segment 646 of the fourth repair stringer 640 of the first set 600. The cap segment 646 of the fourth repair stringer 640 of the first set 600 physically overlaps the cap segment 656 of the first repair stringer 650 of the second set 602. The cap segment 656 of the first repair stringer 650 of the second set 602 physically overlaps the cap segment 616 of the first repair stringer 610 of the first set 600.

Moreover, as shown in FIG. 6A, the cap segments 616, 656, 646, 686 of each of the repair stringers 610, 650, 640, 680 extend from their primary sides across the central plane 230. For instance, the first repair segment 610 is primarily positioned on the first side 232 of the hat stringer 200 but an end of the cap segment 616 extends across the central plane 230 to the second side 234. The first repair segment 650 is primarily positioned on the second side 234 of the hat stringer 200 but an end of the cap segment 656 extends across the central plane 230 to the first side 232. Similarly, the fourth repair segment 640 is primarily positioned on the first side 232 of the hat stringer 200 but an end of the cap segment 646 extends across the central plane 230 to the second side 234. The fourth repair segment 680 is primarily positioned on the second side 234 of the hat stringer 200 but an end of the cap segment 686 extends across the central plane 230 to the first side 232. One of the plurality of fasteners 690 can couple the cap segments 616, 656, 646, 686 as shown in FIG. 6A, which couples the first set 600 with the second set 602.

With the first, second, third, and/or fourth repair stringers 650, 660, 670, 680 of the second set 602 arranged in place and coupled with the base stringer 210, the second set 602 can be deemed to repair the second web segment and a second portion of the cap segment of the base stringer 210. With the first and second sets 600, 602 coupled together as noted above, the first flange segment 212 and the second flange segment 220 can be deemed to be spliced together to complete the splice restoration.

In some further example aspects, a hat stringer can undergo a splice restoration with only a single set of repair stringers, such as a set of "lazy Z" repair stringers. For instance, with reference briefly to FIG. 6B, the first set 600 of repair stringers is shown being utilized to repair the first web segment and a portion of the cap segment 216 that is missing from the cross section of the hat stringer 200. In this example, the base stringer 210 is not damaged or otherwise structurally compromised. Accordingly, in the example of FIG. 6B, a second set of repair stringers (e.g., the second set 602 of FIG. 6A) is not needed to complete the splice restoration.

In yet other example aspects, a hat stringer can undergo a full, partial, or splice restoration using at least one lazy Z-shaped repair stringer and at least one lazy L-shaped repair stringer.

In some example aspects, a repair stringer that can be used to repair or restore a hat stringer according to any of the techniques disclosed herein is provided. The repair stringer can include a web segment. The web segment has an internal profile shaped to match a web portion of a profile of an internal cavity defined by a hat stringer. The repair stringer can further include at least one of a cap segment and a flange segment extending from the web segment. The repair stringer can have a partial cross section with respect to a total cross section of the hat stringer. The repair stringer can be mounted in a plurality of possible mounting locations along the cross section of the hat stringer, e.g., as viewed along a spanwise direction of the hat stringer. In each of the possible mounting locations, the repair stringer is shaped to have an internal profile that matches at least a portion of a profile of an internal cavity defined by the hat stringer. The repair stringer can be formed of one or more plies, such as one or more Carbon Fiber-Reinforced Polymers (CFRP) plies. Examples of such a repair stringer are provided in the examples of FIGS. 3A and 3B, FIG. 3C, FIGS. 4A and 4B, FIG. 5, and FIGS. 6A and 6B.

In yet other example aspects, a hat stringer, or rather a repaired or restored hat stringer, is provided. The hat stringer includes a stringer, such as a base stringer or an existing repair stringer. The hat stringer further includes at least one repair stringer coupled with the stringer. The repair stringer is coupled with the stringer in a mounting location that is one of a plurality of possible mounting locations along a cross section of the hat stringer, and in each of the plurality of possible mounting locations, the repair stringer is shaped to have an internal profile that matches at least a portion of a profile of an internal cavity defined by the hat stringer. A cross-sectional area of the repair stringer is less than a total cross-sectional area of the hat stringer. Examples of such a repaired hat stringer are provided in the examples of FIG. 3B, FIG. 3C, FIG. 4B, FIG. 5, and FIG. 6B.

In some aspects, a repaired hat stringer can include at least one lazy Z repair hat stringer and at least one lazy L repair stringer.

FIG. 7 provides a flow chart for a method 700 of repairing a hat stringer, such as a hat stringer of an aircraft wing.

At 702, the method 700 includes arranging a repair stringer in a mounting location that is one of a plurality of possible mounting locations along a cross section of a hat stringer, and in each of the plurality of possible mounting locations, at least a portion of an internal profile of the repair stringer matches at least a portion of a profile of an internal cavity defined by the hat stringer, and wherein a cross-sectional area of the repair stringer as viewed along a first direction is less than a total cross-sectional area of the hat stringer as viewed along the first direction. In this regard, the repair stringer can be deemed to have a partial cross section with respect to the hat stringer. The repair stringer can be arranged relative to a base stringer and/or another stringer, such as another repair stringer.

In some implementations of the method, in each of the plurality of possible mounting locations, the repair stringer has a web segment that extends parallel with a web segment of the stringer. Stated another way, in each of the plurality of possible mounting locations, the repair stringer has a web segment that extends parallel with a web portion of the profile of the internal cavity. In some further implementations, in each of the plurality of possible mounting locations, the repair stringer has at least one segment that extends parallel with a cap segment or with a flange segment of the stringer. Stated another way, in each of the plurality of possible mounting locations, the repair stringer has at least one segment that extends parallel with a cap portion of the profile of the internal cavity or with a flange segment of the stringer. In yet other implementations, in each of the plurality of possible mounting locations, the repair stringer has one segment that extends parallel with a cap segment of the stringer and one segment that extends parallel with a flange segment of the stringer. Stated another way, in each of the plurality of possible mounting locations, the repair stringer has one segment that extends parallel with a cap portion of the profile of the internal cavity and one segment that extends parallel with a flange segment of the stringer.

In yet further implementations, the hat stringer defines a central plane demarcating a first side and a second side of the hat stringer. In such implementations, the plurality of possible mounting locations include a first possible mounting location in which the repair stringer is positioned primarily on the first side of the hat stringer and a second possible mounting location in which the repair stringer is positioned primarily on the second side of the hat stringer. In this way, the repair stringer is shaped to be mountable to the first side or to the second side of the hat stringer, and regardless of whether the repair stringer is mounted in the first possible mounting location or the second possible mounting location, at least a portion of the internal profile of the repair stringer matches at least a portion of the profile of the internal cavity defined by the hat stringer.

In further implementations, the repair stringer has a cap segment, a flange segment, and a web segment extending between and connecting the cap segment and the flange segment. For instance, the repair stringer can have a "lazy Z" cross section. In such implementations, in arranging the repair stringer in its mounting location, the cap segment, the web segment, and the flange segment of the repair stringer respectively extend parallel with a cap segment, a web segment, and a flange segment of the stringer. Stated another way, in arranging the repair stringer in its mounting location, the cap segment, the web segment, and the flange segment of the repair stringer respectively extend parallel with a cap portion of the profile of the internal cavity, a web portion of the profile of the internal cavity, and a flange segment of a flange segment of the stringer.

In some additional implementations, the plurality of possible mounting locations include at least four possible mounting locations. In such implementations, the hat stringer can define a central plane demarcating a first side and a second side of the hat stringer, and the at least four possible mounting locations can include at least two possible mounting locations in which the repair stringer is positioned primarily on the first side of the hat stringer and at least two possible mounting locations in which the repair stringer is positioned primarily on the second side of the hat stringer.

In some implementations, the at least two possible mounting locations in which the repair stringer is positioned primarily on the first side of the hat stringer include a first mounting location and a second mounting location, and in the first mounting location, one segment of the repair stringer extends parallel with a first flange segment of the stringer and one segment of the repair stringer extends parallel with a first web segment of the stringer, and in the second mounting location, one segment of the repair stringer extends parallel with a cap segment of the stringer and one segment of the repair stringer extends parallel with the first web segment of the stringer. Further, in such implementations, the at least two possible mounting locations in which the repair stringer is positioned primarily on the second side of the hat stringer include a first mounting location and a second mounting location, and in the first mounting location on the second side, one segment of the repair stringer extends parallel with a cap segment of the stringer and one segment of the repair stringer extends parallel with the second web segment of the stringer, and in the second mounting location on the second side, one segment of the repair stringer extends parallel with a second flange segment of the stringer and one segment of the repair stringer extends parallel with a second web segment of the stringer.

In some further implementations in which the plurality of possible mounting locations include at least four possible mounting locations, the stringer includes a first flange segment, a first web segment, a cap segment, a second web segment, and a second flange segment, and wherein the plurality of possible mounting locations along the cross section of the hat stringer include a first mounting location, a second mounting location, a third mounting location, and a fourth mounting location. In the first mounting location, one segment of the repair stringer extends parallel with the first flange segment of the stringer and one segment of the repair stringer extends parallel with a first web segment of the stringer. In the second mounting location, one segment of the repair stringer extends parallel with the cap segment of the stringer and one segment of the repair stringer extends parallel with the first web segment of the stringer. In the third mounting location, one segment of the repair stringer extends parallel with the cap segment of the stringer and one segment of the repair stringer extends parallel with the second web segment of the stringer. In the fourth mounting location, one segment of the repair stringer extends parallel with the second flange segment of the stringer and one segment of the repair stringer extends parallel with the second web segment of the stringer. In such implementations, the first repair stringer can be a first repair stringer and the mounting location can be the first mounting location, and the method can further include arranging a second repair stringer in the second mounting location; arranging a third repair stringer in the third mounting location; arranging a fourth repair stringer in the fourth mounting location; and coupling the second repair stringer, the third repair stringer, and the fourth repair stringer to the stringer in the second mounting location, the third mounting location, and the fourth mounting location, respectively, the first repair stringer being coupled with the stringer in the first mounting location.

In some further implementations, the first and second repair stringers physically overlap one another, the second and third repair stringers physically overlap one another, and the third and fourth repair stringers physically overlap one another (such as in the example of FIGS. 4A and 4B). In yet other implementations, the first, second, third, and fourth repair stringers all have a same cross-sectional shape, and wherein the second repair stringer is oriented so as to be flipped vertically and horizontally with respect to the first repair stringer, the third repair stringer is oriented so as to be flipped vertically with respect to the first repair stringer, and the fourth repair stringer is oriented so as to be flipped horizontally with respect to the first repair stringer (such as in the example of FIGS. 4A and 4B).

In some implementations of the method 700, the repair stringer can have a "lazy Z" cross-sectional shape and can be mountable in a plurality of mounting locations along the cross section of a hat stringer, and regardless of its mounting location, at least a portion of an internal profile of the repair stringer matches at least a portion of a profile of an internal cavity defined by the hat stringer. For example, the repair stringer can be mounted in the mounting location in which the first repair stringer 300 is mounted in FIGS. 3A and 3B, in the mounting location in which the second repair stringer 310 is mounted in FIGS. 3A and 3B, or some other mounting location. In each of these mounting locations, the internal profile of the repair stringer matches at least a portion of a profile of the internal cavity of the hat stringer. In some implementations, the repair stringer is mountable in at least two possible mounting locations. In some further implementations, the repair stringer having a "lazy Z" cross-sectional shape is capable of being mounted in a plurality of possible mounting locations along a cross section of a hat stringer, and in at least two of the possible mounting locations, in different mounting orientations, e.g., a first orientation in a first mounting location in which the repair stringer is right-side-up and a second orientation in a second mounting location in which the repair stringer has been flipped horizontally with respect to the first orientation. In each of the mounting orientations, at least a portion of the internal profile of the repair stringer matches at least a portion of the profile of the internal cavity defined by the hat stringer.

In some other implementations of the method 700, the repair stringer can have a "lazy L" cross-sectional shape and can be mountable in a plurality of mounting locations along the cross section of a hat stringer, and regardless of its mounting location, at least a portion of an internal profile of the repair stringer matches at least a portion of a profile of an internal cavity defined by the hat stringer. For example, the repair stringer can be mounted in the mounting location in which the first repair stringer 400 is mounted in FIGS. 4A and 4B, in the mounting location in which the second repair stringer 410 is mounted in FIGS. 4A and 4B, in the mounting location in which the third repair stringer 420 is mounted in FIGS. 4A and 4B, in the mounting location in which the fourth repair stringer 430 is mounted in FIGS. 4A and 4B, or some other mounting location. In each of these mounting locations, the internal profile of the repair stringer matches at least a portion of a profile of the internal cavity of the hat stringer. In some implementations, the repair stringer is mountable in at least four possible mounting locations.

In some further implementations, the repair stringer having a "lazy L" cross-sectional shape is capable of being mounted in a plurality of possible mounting locations along a cross section of a hat stringer, and in at least four of the possible mounting locations, in different mounting orientations, e.g., a first orientation in a first mounting location in which the repair stringer is right-side-up, a second orientation in a second mounting location in which the repair stringer is upside down with respect to the first orientation, a third orientation in a third mounting location in which the repair stringer is right-side-up but flipped horizontally with respect to the first orientation, and a fourth orientation in a fourth mounting location in which the repair stringer is upside down and flipped horizontally with respect to the first orientation. In each of the mounting orientations, at least a portion of the internal profile of the repair stringer matches at least a portion of the profile of the internal cavity defined by the hat stringer.

At 704, the method 700 includes coupling the repair stringer with a stringer of the hat stringer in the mounting location. For instance, the repair stringer can be coupled with the hat stringer in a suitable manner, such as by mechanical fasteners, a thermal process, a compression process, a combination thereof, etc.

In some further implementations, the repair stringer can be a first repair stringer and the method 700 can further include arranging a second repair stringer in a mounting location along the cross section of the hat stringer, the second repair stringer is shaped to have an internal profile that matches at least a portion of the profile of the internal cavity. Like the first repair segment, a cross-sectional area of the second repair stringer as viewed along the first direction is less than a total cross-sectional area of the hat stringer as viewed along the first direction. In this regard, the second repair stringer can be deemed to have a partial cross section with respect to the hat stringer. In some implementations, the second repair stringer has a same cross-sectional shape as the first repair stringer, e.g., as viewed along the first direction.

In some further implementations, the second repair stringer is arranged so that a cap segment of the second repair stringer and a cap segment of the first repair stringer physically overlap and each extend parallel with a cap segment of the stringer, or stated differently, each extend parallel with a cap portion of the profile of the internal cavity of the hat stringer. In yet further implementations, the first repair stringer has a web segment that physically overlaps a first web segment of the stringer and the second repair stringer has a web segment that physically overlaps a second web segment of the stringer.

In yet additional implementations, the second repair stringer has a flange segment that extends parallel with, but is spaced from, a second flange segment of the stringer. In such implementations, the method 700 can further include placing one or more shims between the second flange segment and the flange segment of the second repair stringer.

In implementations in which the second repair stringer is arranged along the cross section of the hat stringer, at 704, the method 700 can further include coupling the second repair stringer to the stringer, e.g., by mechanical fasteners, a thermal process, a compression process, a combination thereof, etc.

Figure 8:
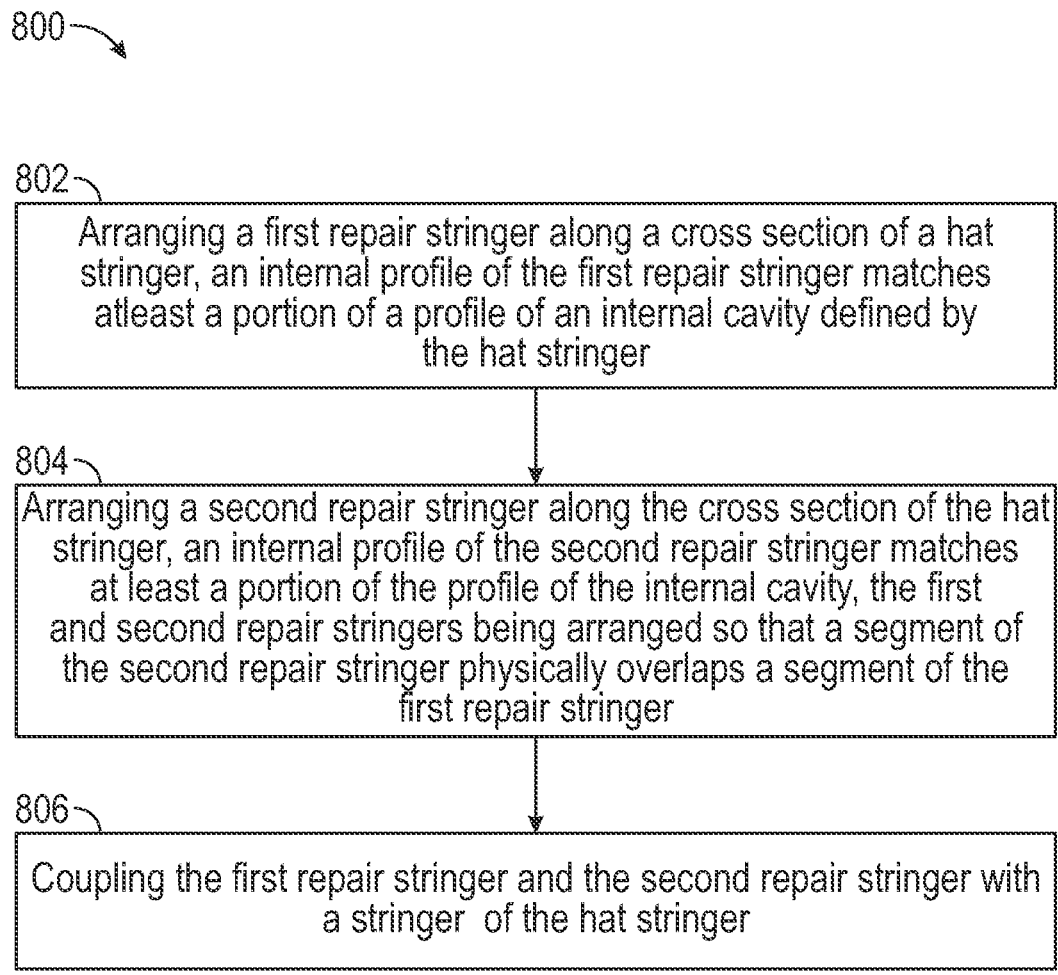
FIG. 8 is a flow diagram of a method of repairing a hat stringer according to another aspect of the present disclosure.

FIG. 8 provides a flow chart for a method 800 of repairing a hat stringer, such as a hat stringer of an aircraft wing.

At 802, the method 800 includes arranging a first repair stringer along a cross section of a hat stringer, an internal profile of the first repair stringer matches at least a portion of a profile of an internal cavity defined by the hat stringer. As one example, the first repair stringer can have a "lazy Z" cross-sectional shape. As another example, the first repair stringer can have a "lazy L" cross-sectional shape. The first repair stringer can be arranged so that at least a first segment thereof is arranged parallel with a web portion of the profile of the internal cavity and so that a second segment thereof is arranged parallel with a cap portion of the profile of the internal cavity or so that the second segment is arranged parallel with a flange segment of a base stringer. In some implementations, the first repair stringer can include a third segment that is connected with the second segment via the first segment. The third segment extends parallel with the second segment.

At 804, the method 800 includes arranging a second repair stringer along the cross section of the hat stringer, an internal profile of the second repair stringer matches at least a portion of the profile of the internal cavity, the first and second repair stringers being arranged so that a segment of the second repair stringer physically overlaps a segment of the first repair stringer. As one example, the second repair stringer can have a "lazy Z" cross-sectional shape. As another example, the second repair stringer can have a "lazy L" cross-sectional shape. The second repair stringer can be arranged so that at least a first segment thereof is arranged parallel with a web portion of the profile of the internal cavity, which can be the same web portion that the first segment of the first repair segment is aligned parallel with or a different web portion. A second segment of the second repair stringer can be arranged parallel with the cap portion of the profile of the internal cavity or so that the second segment of the second repair stringer is arranged parallel with a flange segment of the base stringer. In some implementations, the second repair stringer can include a third segment that is connected with the second segment of the second repair stringer via the first segment of the second repair stringer. The third segment of the second repair stringer extends parallel with the second segment of the second repair stringer.

Further, in some implementations, the first and second repair stringers are arranged so that the segment of the second repair stringer physically overlaps the segment of the first repair stringer along a web section of the hat stringer (an example of which is shown in FIG. 4A, wherein the web segment 414 of the second repair stringer 410 physically overlaps the web segment 404 of the first repair stringer 400 along a web section of the hat stringer 200). In yet other implementations, the first and second repair stringers are arranged so that the segment of the second repair stringer physically overlaps the segment of the first repair stringer along a cap section of the hat stringer (an example of which is shown in FIG. 3B, wherein the cap segment 316 of the second repair stringer 310 physically overlaps the cap segment 306 of the first repair stringer 300 along a cap section of the hat stringer 200).

At 806, the method 800 includes coupling the first repair stringer and the second repair stringer with a stringer of the hat stringer. For instance, the repair stringers can be coupled with the base stringer in a suitable manner, such as by mechanical fasteners (such as in the examples of FIGS. 3B, 3C, 4B), a thermal process, a compression process, a combination thereof, etc.

Figure 9:
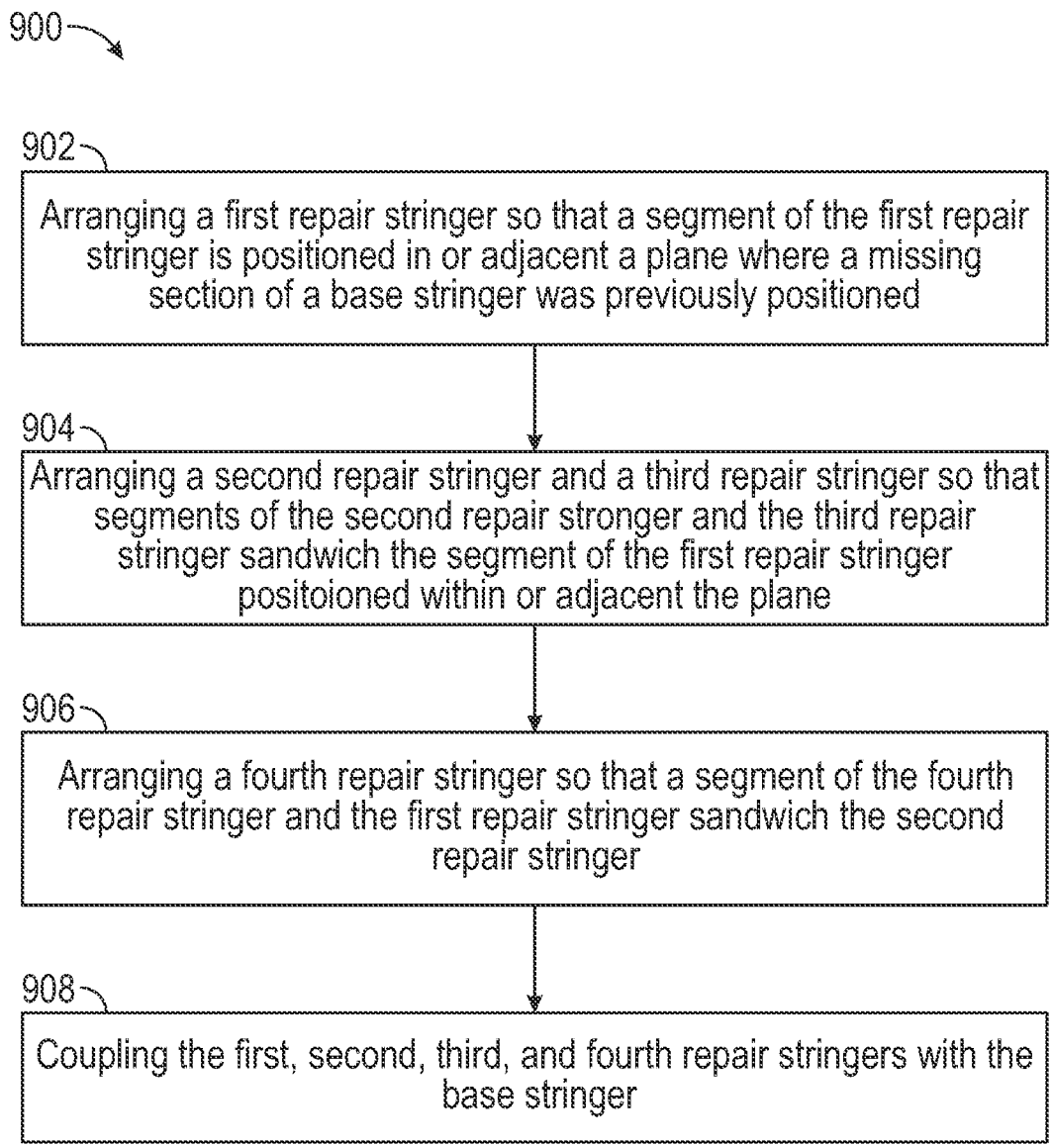
FIG. 9 is a flow diagram of a method of splicing a hat stringer according to another aspect of the present disclosure.

FIG. 9 provides a flow chart for a method 900 of performing a splice restoration of a hat stringer, such as a hat stringer of an aircraft wing.

Figure 6B:
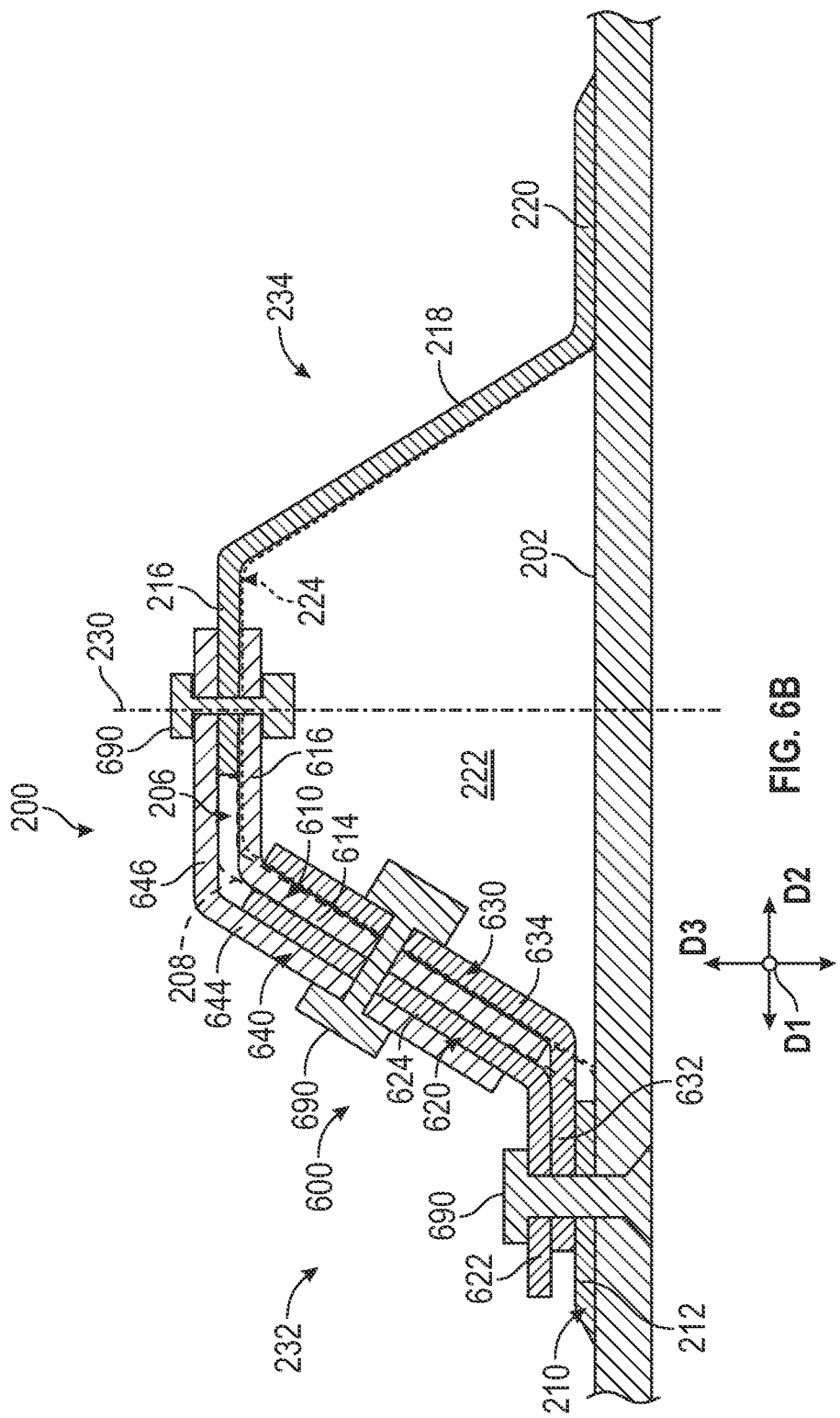
FIG. 6B is a cross-sectional view of another hat stringer undergoing a segment splice restoration.

At 902, the method 900 includes arranging a first repair stringer so that a segment of the first repair stringer is positioned in or adjacent a plane where a missing section of a base stringer was previously positioned. By way of example, in FIG. 6A, the first repair stringer 610 is shown being arranged so that its web segment 614 is positioned in or adjacent the plane 208 where the missing section 206 of the base stringer 210 was previously positioned. FIG. 6B provides another example. In some implementations, the missing section can include one or more web segments, a cap segment, or a combination thereof of the base stringer.

At 904, the method 900 includes arranging a second repair stringer and a third repair stringer so that segments of the second repair stringer and the third repair stringer sandwich the segment of the first repair stringer positioned within or adjacent the plane. By way of example, in FIG. 6A, the second repair stringer 620 and the third repair stringer 630 are shown being arranged so that that their respective web segments 624, 634 sandwich the web segment 614 of the first repair stringer 610 positioned within or adjacent the plane 208. FIG. 6B provides another example.

At 906, the method 900 includes arranging a fourth repair stringer so that a segment of the fourth repair stringer and the first repair stringer sandwich the second repair stringer. By way of example, in FIG. 6A, the fourth repair stringer 640 is shown being arranged so that its web segment 644 and the web segment 614 of the first repair stringer 610 sandwich the web segment 624 of the second repair segment 620. FIG. 6B provides another example.

At 908, the method 900 includes coupling the first, second, third, and fourth repair stringers with the base stringer. For instance, the repair stringers can be coupled with the base stringer in a suitable manner, such as by mechanical fasteners (such as in the example of FIG. 6A or in the example of FIG. 6B), a thermal process, a compression process, a combination thereof, etc.

In some implementations, the first, second, third, and fourth repair stringers are all shaped to have an internal profile that matches at least a portion of a profile of an internal cavity defined by the hat stringer. In some further implementations, the first, second, third, and fourth repair stringers all have a same cross-sectional shape as one another.

In some further implementations, the second and third repair stringers have a same mounting orientation and the first and fourth have a same mounting orientation. For instance, in the example of FIG. 6A, the second and third repair stringers 620, 630 have a same mounting orientation and the first and fourth repair stringer 610, 640 have a same mounting orientation. Particularly, in the example of FIG. 6A, the second and third repair stringers 620, 630 are oriented so as to be flipped vertically and horizontally with respect to the first and fourth repair stringers 610, 640.

In some implementations, the missing section includes a first web segment, a cap segment, and a second web segment of the base stringer. In such implementations, the first, second, third, and fourth repair stringers form a first set of repair stringers coupled with the base stringer to repair the first web segment and a first portion of the cap segment of the base stringer. In such implementations, the method 900 can further include arranging a second set of repair stringers, which can include a first, second, third, and fourth repair stringer, and coupling the repair stringers of the second set with the base stringer to repair the second web segment and a second portion of the cap segment of the base stringer. An example of a first set of repair stringers and a second set of repair stringers being utilized to splice a damaged base stringer is shown in FIG. 6A.

What is claimed is:

1. A method, comprising:
    arranging a first repair stringer in a mounting location along a cross section of a hat stringer, the first repair stringer is shaped to have an internal profile that matches at least a portion of a profile of an internal cavity defined by the hat stringer, and wherein the first repair stringer has a first cap segment, a first flange segment, and a first web segment arranged on a cap segment, a first flange segment, and a first web segment of a stringer of the hat stringer;
    arranging a second repair stringer in a mounting location along the cross section of the hat stringer, the second repair stringer is shaped to have an internal profile that matches at least a portion of the profile of the internal cavity, and wherein the second repair stringer has a second cap segment, a second flange segment, and a second web segment extending between and connecting the second cap segment, wherein the second cap segment and the first cap segment of the first repair stringer physically overlap one another and each extend parallel with a cap portion of the profile of the internal cavity;
    placing one or more shims between the second flange segment of the second repair stringer and a second flange segment of the stringer; and
    coupling the first repair stringer and the second repair stringer with the stringer.

2. The method of claim 1, wherein the first web segment of the first repair stringer extends parallel with a first web portion of the profile of the internal cavity and the second web segment of the second repair stringer extends parallel with a second web portion of the profile of the internal cavity.

3. The method of claim 2, wherein the first cap segment of the first repair stringer and the second cap segment of the second repair stringer both extend parallel with a cap portion of the internal cavity.

4. The method of claim 1, wherein the hat stringer defines a central plane demarcating a first side and a second side of the hat stringer, and wherein the first repair stringer is positioned primarily on the first side of the hat stringer and the second repair stringer is positioned primarily on the second side of the hat stringer.

5. The method of claim 1, wherein in arranging the first repair stringer in the mounting location, the first cap segment, the first web segment, and the first flange segment of the first repair stringer respectively extend parallel with the first cap segment, the first web segment, and the first flange segment of the stringer.

6. The method of claim 1,
    wherein the second cap segment of the second repair stringer and the first cap segment of the first repair stringer physically overlap one another and each extend parallel with a cap portion of the profile of the internal cavity.

7. The method of claim 6, wherein the second web segment is arranged on a second web segment of the stringer.

8. The method of claim 1, wherein the second repair stringer has a same cross-sectional shape as the first repair stringer as viewed along a first direction.

9. The method of claim 1, further comprising:
    arranging a second repair stringer in a mounting location along the cross section of the hat stringer, the second repair stringer is shaped to have an internal profile that matches at least a portion of the profile of the internal cavity;
    arranging a third repair stringer in a mounting location along the cross section of the hat stringer, the third repair stringer has a first web segment, a cap segment, and a second web segment, and
    wherein the first web segment is coupled with the repair stringer, the cap segment is coupled with the stringer, and the second web segment is coupled with the second repair stringer.

10. The method of claim 1, wherein the hat stringer defines a central plane demarcating a first side and a second side of the hat stringer and the plurality of possible mounting locations include at least four possible mounting locations, and wherein the at least four possible mounting locations include at least two possible mounting locations in which the repair stringer is capable of being positioned primarily on the first side of the hat stringer and at least two possible mounting locations in which the repair stringer is capable of being positioned primarily on the second side of the hat stringer.

11. The method of claim 10, wherein the at least two possible mounting locations in which the repair stringer is capable of being positioned primarily on the first side of the hat stringer include a first mounting location and a second mounting location, and
    in the first mounting location, one segment of the repair stringer extends parallel with a first flange segment of the stringer and one segment of the repair stringer extends parallel with a first web segment of the stringer, and in the second mounting location, one segment of the repair stringer extends parallel with a cap segment of the stringer and one segment of the repair stringer extends parallel with the first web segment of the stringer.

12. The method of claim 11, wherein the at least two possible mounting locations in which the repair stringer is positioned primarily on the second side of the hat stringer include a first mounting location and a second mounting location, and
in the first mounting location, one segment of the repair stringer extends parallel with a cap segment of the stringer and one segment of the repair stringer extends parallel with a second web segment of the stringer, and
in the second mounting location, one segment of the repair stringer extends parallel with a second flange segment of the stringer and one segment of the repair stringer extends parallel with the second web segment of the stringer.

13. The method of claim 1, wherein the stringer includes a first flange segment, a first web segment, a cap segment, a second web segment, and a second flange segment, and wherein the plurality of possible mounting locations along the cross section of the hat stringer include a first mounting location, a second mounting location, a third mounting location, and a fourth mounting location, and:
in the first mounting location, one segment of the repair stringer extends parallel with the first flange segment of the stringer and one segment of the repair stringer extends parallel with a first web segment of the stringer,
in the second mounting location, one segment of the repair stringer extends parallel with the cap segment of the stringer and one segment of the repair stringer extends parallel with the first web segment of the stringer,
in the third mounting location, one segment of the repair stringer extends parallel with the cap segment of the stringer and one segment of the repair stringer extends parallel with the second web segment of the stringer, and
in the fourth mounting location, one segment of the repair stringer extends parallel with the second flange segment of the stringer and one segment of the repair stringer extends parallel with the second web segment of the stringer.

14. The method of claim 13, wherein the repair stringer is a first repair stringer and the mounting location is the first mounting location, and wherein the method further comprises:
arranging a second repair stringer in the second mounting location;
arranging a third repair stringer in the third mounting location;
arranging a fourth repair stringer in the fourth mounting location; and
coupling the second repair stringer, the third repair stringer, and the fourth repair stringer to the stringer in the second mounting location, the third mounting location, and the fourth mounting location, respectively, the first repair stringer being coupled with the stringer in the first mounting location.

15. The method of claim 14, wherein the first and second repair stringers physically overlap one another, the second and third repair stringers physically overlap one another, and the third and fourth repair stringers physically overlap one another.

16. The method of claim 15, wherein the first, second, third, and fourth repair stringers all have a same cross-sectional shape as viewed along the first direction, and wherein the second repair stringer is oriented so as to be flipped vertically and horizontally with respect to the first repair stringer, the third repair stringer is oriented so as to be flipped vertically with respect to the first repair stringer, and the fourth repair stringer is oriented so as to be flipped horizontally with respect to the first repair stringer.

17. The method of claim 1, wherein the first repair stringer is arranged so that a segment of the first repair stringer is positioned in or adjacent a plane where a missing section of the stringer was previously positioned, and wherein the method further comprises:
arranging the second repair stringer and a third repair stringer so that segments of the second repair stringer and the third repair stringer sandwich the segment of the first repair stringer positioned within or adjacent the plane;
arranging a fourth repair stringer so that a segment of the fourth repair stringer and the first repair stringer sandwich the second repair stringer; and
coupling the first, second, third, and fourth repair stringers with one another and the stringer.

18. A method, comprising:
arranging a first repair stringer along a cross section of a hat stringer, an internal profile of the first repair stringer matches at least a portion of a profile of an internal cavity defined by the hat stringer, wherein the first repair stringer has a first cap segment, a first flange segment, and a first web segment extending between and connecting the first cap segment and the first flange segment, and wherein in arranging the first repair stringer, the first cap segment, the first web segment, and the first flange segment of the first repair stringer respectively extend parallel with a cap segment, a first web segment, and a first flange segment of the hat stringer;
arranging a second repair stringer along the cross section of the hat stringer, an internal profile of the second repair stringer matches at least a portion of the profile of the internal cavity, wherein the second repair stringer has a second cap segment, a second flange segment, and a second web segment extending between and connecting the second cap segment and the second flange segment, and wherein in arranging the second repair stringer, the second cap segment, the second web segment, and the second flange segment of the second repair stringer respectively extend parallel with the cap segment, a second web segment, and a second flange segment of the hat stringer, and wherein the first and second repair stringers are arranged so that the second cap segment of the second repair stringer physically overlaps the first cap segment of the first repair stringer; and
coupling the first repair stringer and the second repair stringer with a stringer of the hat stringer.

19. A method, comprising:
arranging a first repair stringer along a cross section of a hat stringer, wherein the first repair stringer is arranged so that a segment of the first repair stringer is positioned in or adjacent a plane where a missing section of a stringer of the hat stringer was previously positioned;
arranging a second repair stringer and a third repair stringer so that segments of the second repair stringer and the third repair stringer sandwich the segment of the first repair stringer positioned within or adjacent the plane;

arranging a fourth repair stringer so that a segment of the fourth repair stringer and the first repair stringer sandwich the second repair stringer; and coupling the first, second, third, and fourth repair stringers with one another and the stringer.

\* \* \* \* \*